US012252884B2

(12) United States Patent
Gantt

(10) Patent No.: US 12,252,884 B2
(45) Date of Patent: Mar. 18, 2025

(54) GUTTER SYSTEM HAVING A GUTTER, BRACKET, AND COVER, AND METHOD OF INSTALLING THE GUTTER SYSTEM

(71) Applicant: Independence Materials Group, LLC, Virginia Beach, VA (US)

(72) Inventor: William A. Gantt, Blair, SC (US)

(73) Assignee: Independence Materials Group, LLC, Virginia Beach, VA (US)

( * ) Notice: Subject to any disclaimer, the term of this patent is extended or adjusted under 35 U.S.C. 154(b) by 0 days.

(21) Appl. No.: 17/707,914

(22) Filed: Mar. 29, 2022

(65) Prior Publication Data

US 2022/0316216 A1 Oct. 6, 2022

Related U.S. Application Data

(60) Provisional application No. 63/221,142, filed on Jul. 13, 2021, provisional application No. 63/167,969, filed on Mar. 30, 2021.

(51) Int. Cl.
*E04D 13/068* (2006.01)
*E04D 13/072* (2006.01)
*E04D 13/076* (2006.01)

(52) U.S. Cl.
CPC ..... *E04D 13/0685* (2013.01); *E04D 13/0727* (2013.01); *E04D 13/076* (2013.01)

(58) Field of Classification Search
CPC . E04D 13/0641; E04D 13/076; E04D 13/072; E04D 13/0725; E04D 13/0727; E04D 13/064; E04D 13/068; E04D 13/0685
See application file for complete search history.

(56) References Cited

U.S. PATENT DOCUMENTS

| | | | | |
|---|---|---|---|---|
| 4,745,657 | A | * 5/1988 | Faye | E04D 13/076 16/389 |
| 4,998,386 | A | * 3/1991 | Baumgarth | E04D 13/0641 52/16 |
| 5,274,965 | A | * 1/1994 | Jackson | E04D 13/076 52/12 |

(Continued)

OTHER PUBLICATIONS

Independence Materials Group, LLC, Canadian Patent Application No. 3,153,649, Office Action, Jan. 10, 2024.

(Continued)

*Primary Examiner* — Jessica L Laux
(74) *Attorney, Agent, or Firm* — Moore & Van Allen PLLC; Jeffrey R. Gray

(57) ABSTRACT

A gutter system having a gutter, a plurality of brackets, and a cover. The plurality of brackets comprise a support portion and a connector portion for operatively coupling the bracket to the gutter and the cover. The support portion comprises a cover support portion that is operatively coupled to a contoured nose of the cover and a gutter support portion that is operatively coupled to a lip of the gutter. The connector portion comprises a gutter hanger portion that is configured to receive a portion of a rear wall of the gutter and a cover engaging portion that is configured to receive a portion of the cover. The cover comprises a plurality of louvers having one or more louver arms that extend towards an interior of the gutter when the cover is operatively coupled to the gutter.

16 Claims, 31 Drawing Sheets

(56) References Cited

U.S. PATENT DOCUMENTS

| | | | |
|---|---|---|---|
| 5,617,678 A * | 4/1997 | Morandin | E04D 13/0725 52/12 |
| 5,845,435 A | 12/1998 | Knudson | |
| 5,884,876 A * | 3/1999 | Axford | E04D 13/0722 248/48.1 |
| 6,164,020 A | 12/2000 | Nitch | |
| 6,202,358 B1 | 3/2001 | Janesky | |
| 6,453,622 B1 | 9/2002 | Walters | |
| 6,470,628 B1 | 10/2002 | Walters | |
| 6,568,132 B1 | 5/2003 | Walters | |
| 6,672,012 B2 | 1/2004 | Bahroos et al. | |
| 6,880,294 B2 | 4/2005 | Walters | |
| 6,993,870 B2 | 2/2006 | Mcdonald et al. | |
| 6,993,871 B2 | 2/2006 | Richard et al. | |
| 7,117,642 B2 | 10/2006 | Brown | |
| 7,117,643 B2 | 10/2006 | Brown | |
| 7,257,933 B2 | 8/2007 | Walters | |
| 7,347,027 B2 | 3/2008 | Mcdonald et al. | |
| 7,506,476 B2 | 3/2009 | Mcdonald et al. | |
| 7,584,576 B2 | 9/2009 | Mcdonald et al. | |
| 7,665,247 B1 | 2/2010 | Pratt | |
| 7,707,781 B2 | 5/2010 | Van Cleave et al. | |
| 7,736,090 B2 | 6/2010 | Janesky | |
| 7,752,812 B2 | 7/2010 | Knudson et al. | |
| 7,895,869 B2 | 3/2011 | Walters | |
| RE42,896 E | 11/2011 | Higginbotham | |
| 8,117,785 B2 * | 2/2012 | Teichner | E04D 13/076 52/12 |
| RE43,555 E | 7/2012 | Higginbotham | |
| 8,225,556 B2 | 7/2012 | Brown | |
| 8,925,253 B2 | 1/2015 | Bullinger | |
| 8,997,403 B1 * | 4/2015 | Steinberg | F16M 13/02 52/12 |
| D822,802 S | 7/2018 | Karabacak | |
| D831,175 S | 10/2018 | Jackson | |
| D873,979 S | 1/2020 | Brochu | |
| D885,533 S | 5/2020 | Gori et al. | |
| D898,168 S | 10/2020 | Wagaman | |
| 10,858,837 B2 | 12/2020 | Lenney | |
| 10,858,838 B1 | 12/2020 | Ng | |
| 10,889,991 B2 | 1/2021 | Folkersen et al. | |
| 10,900,234 B2 | 1/2021 | Dressel | |
| D917,024 S | 4/2021 | Ealer, Sr. | |
| 11,015,348 B2 | 5/2021 | Gori | |
| D923,760 S | 6/2021 | Graves | |
| 2005/0115190 A1 | 6/2005 | Brown | |
| 2010/0251626 A1 * | 10/2010 | Roque Alonso | E04D 13/0641 52/12 |
| 2012/0222366 A1 | 9/2012 | Steinberg et al. | |
| 2015/0184392 A1 | 7/2015 | Steinberg et al. | |
| 2019/0368199 A1 * | 12/2019 | Gori | G01B 3/14 |
| 2020/0378128 A1 | 12/2020 | Iannelli | |
| 2021/0002899 A1 | 1/2021 | Enney | |
| 2021/0002900 A1 | 1/2021 | Lenney | |
| 2021/0045518 A1 | 2/2021 | Lenney | |
| 2021/0062512 A1 | 3/2021 | Brochu | |
| 2021/0087817 A1 | 3/2021 | Lenney | |
| 2021/0108419 A1 | 4/2021 | Folkersen et al. | |
| 2021/0140176 A1 | 5/2021 | Lenney | |

OTHER PUBLICATIONS

Gutterplus, "Low Maintenance flushing removable End Cap", Gutterplus.NZ, Image 5, https://gutterplus.nz/swanson-eco-build-gallery.html, first archived Dec. 21, 2019 by bing.com.

Independence Materials Group, LLC, Canadian Patent Application No. 3,153,649, Office Action, Oct. 16, 2024.

* cited by examiner

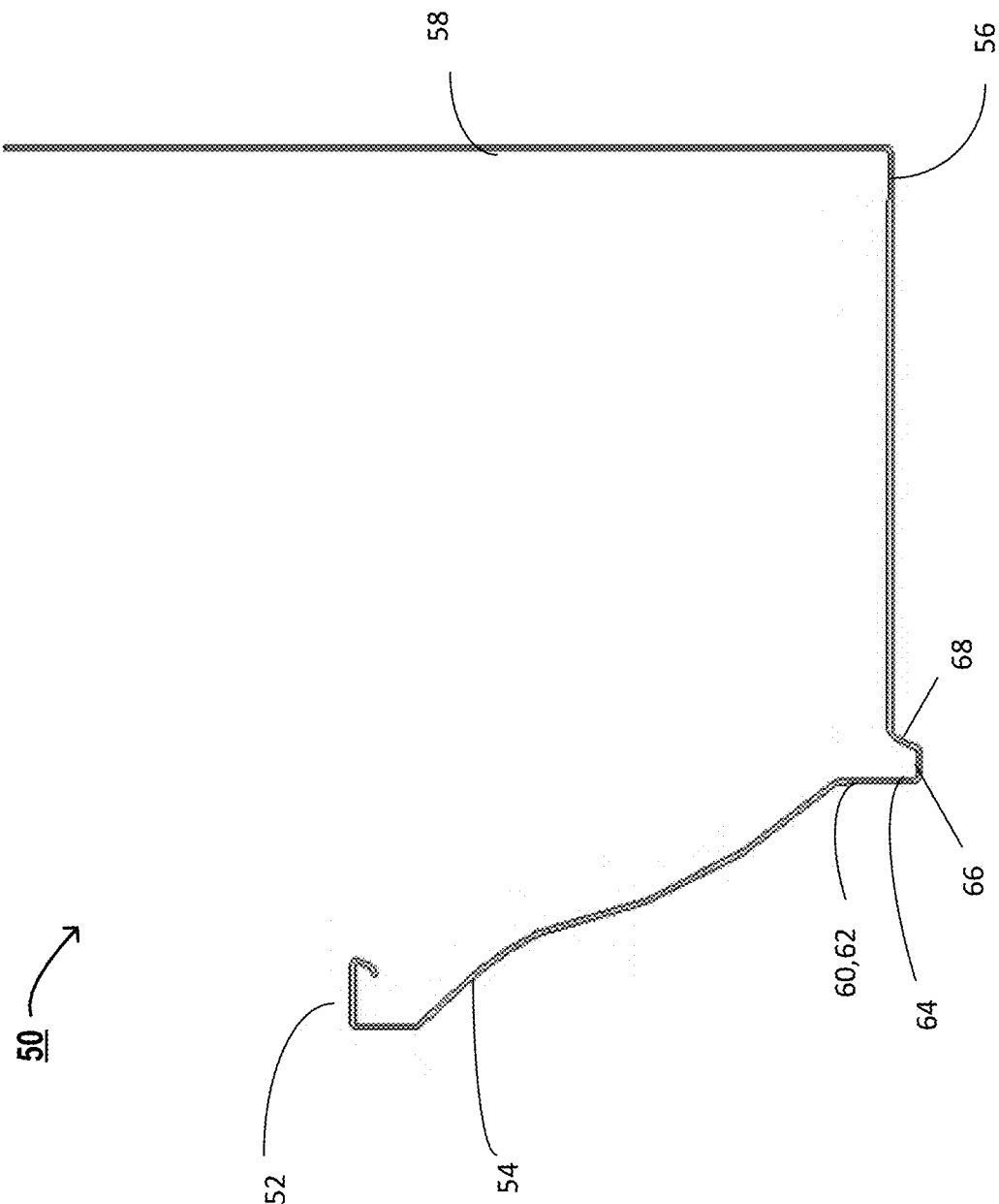

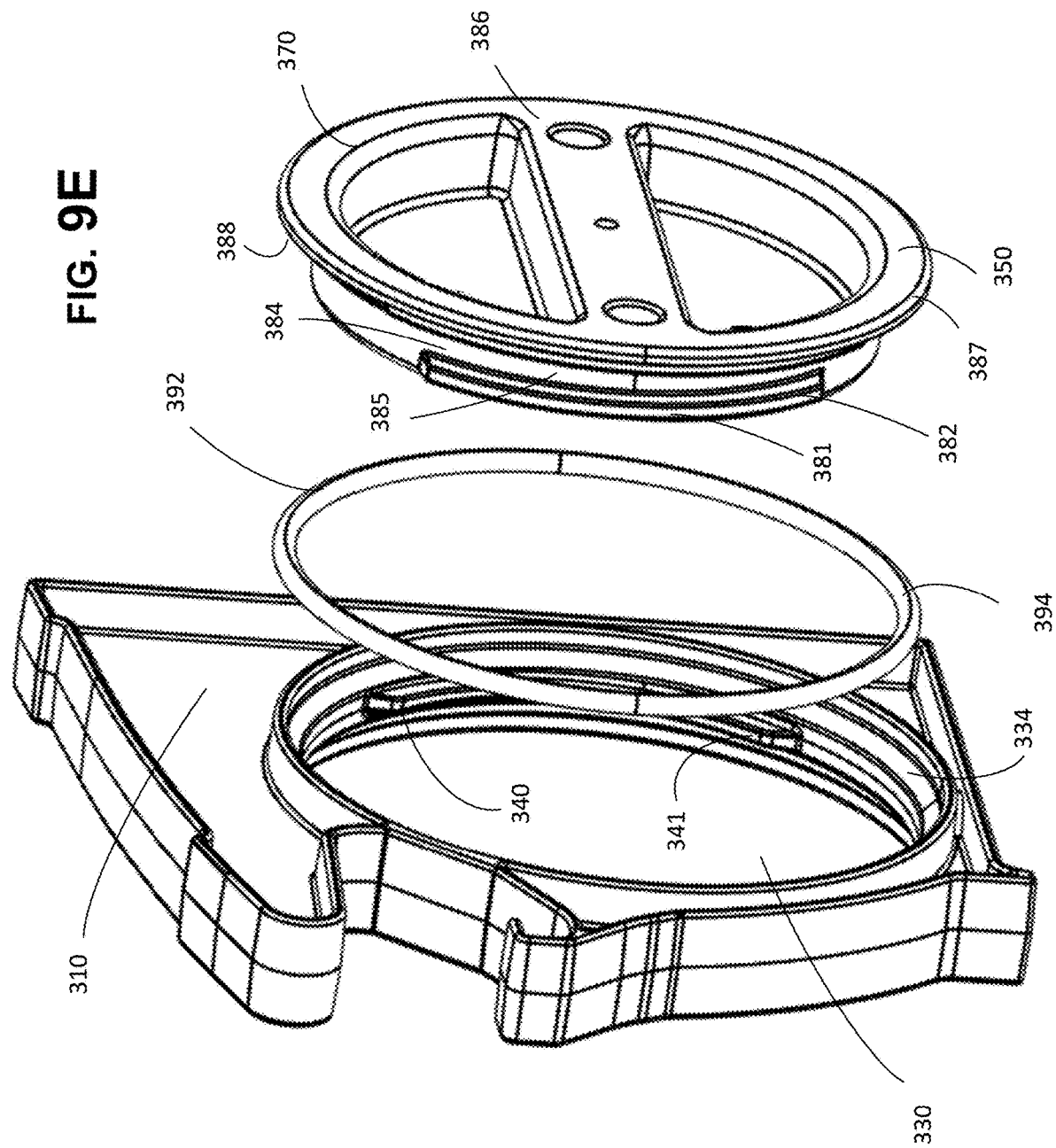

GUTTER SYSTEM HAVING A GUTTER, BRACKET, AND COVER, AND METHOD OF INSTALLING THE GUTTER SYSTEM

FIELD

This application relates generally to the field of gutter systems, and more particularly to a gutter system having a gutter, bracket, and cover, and a method of installing the gutter system.

BACKGROUND

Typically, gutter systems are used in residential, commercial, and/or industrial buildings to collect rainwater from the entire building or a portion of a building. However, a common problem within existing gutter systems is that they often get blocked by debris (e.g., leaves, twigs, dust, or the like). Blockage in gutter systems may cause rainwater to accumulate in parts of the gutter systems and on a roof of the building, thereby causing damage to the building. As such, there exists a need for a gutter system that prevents accumulation of debris and allows rainwater to flow freely without causing any damage to the building.

BRIEF SUMMARY

Embodiments of the present invention relate to a gutter system, where the gutter system comprises a gutter, a plurality of brackets at least partially located within the gutter, and a cover operatively coupled to the plurality of brackets. The plurality of brackets comprise a support portion and a connector portion operatively coupled to the support portion, where the connector portion is used to operatively couple the bracket to the cover and in some embodiments to the gutter. As such, the connector portion of the bracket may comprise a cover engaging portion configured to receive a portion of the cover, such as a projection on a second end of the cover.

In some embodiments, the support portion of the bracket further comprises a cover support portion that is operatively coupled to a contoured nose of the cover, a gutter support portion that is operatively coupled to a lip of the gutter, and a rear support portion that is operative coupled to a rear wall of the gutter. In some embodiments, the cover support portion further comprises a louver recess that receives louvers of the cover and a cover receiving surface for receiving a projection on the first end of the cover. In some embodiments, the cover receiving surface is a concave receiving surface. In some embodiments, the projection of the cover is a concave projection that is received by the cover receiving surface.

In some embodiments, the bracket further comprises a single fastener cavity, where the bracket is operatively coupled to a structure (e.g., a support member, such as a facia board) using a single fastener extending through the single fastener cavity and the rear wall of the gutter.

In some embodiments, the cover comprises a first end comprising a contoured nose that receives a covered support portion of the plurality of brackets, a second end, wherein a portion of the second end is operatively coupled to one or more of the plurality of brackets, and an intermediate portion between the first end and the second end having a plurality of louvers. In some embodiments, the plurality of louvers have one or more louver arms that extend towards an interior of the gutter when the cover is operatively coupled to the plurality of brackets.

Embodiments of the present invention also relate to a method of installing a gutter system. The method comprises assembling a plurality of brackets to a gutter, wherein each of the plurality of brackets comprise a support portion (e.g., gutter support portion and rear support portion) operatively coupled to a lip of the gutter and/or to a rear wall of the gutter, and a connector portion operatively coupled to the support portion, wherein the connector portion is operatively coupled to the cover and/or a rear wall of the gutter. The method further comprises assembling a first end of a cover around the support portion of the plurality of brackets, assembling a second end of the cover to the connector portion of the of the plurality of brackets, potentially assembling one or more end caps to the gutter to form the gutter system, lifting the gutter system for installation to a structure, and fastening the plurality of brackets to the structure using a single fastener through each of the plurality of brackets.

One embodiments of the invention comprises a gutter system. The gutter system comprising a gutter, a plurality of brackets at least partially located within the gutter, and a cover operatively coupled to the plurality of brackets.

In further accord with embodiments of the invention, the plurality of brackets are operatively coupled to the gutter and the cover is operatively coupled to the plurality of brackets before the plurality of brackets are operatively coupled to a structure.

In other embodiments, at least one bracket of the plurality of brackets comprise a support portion, and a connector portion operatively coupled to the support portion. The connector portion operatively couples the bracket to the cover.

In yet other embodiments, the connector portion comprises a cover engaging portion configured to receive a cover portion.

In still other embodiments, the cover engaging portion is configured to receive a second end of the cover.

In other embodiments, the support portion comprises a tab and the connector portion comprises a tab aperture, and wherein the connector portion is operatively coupled to the support portion by inserting the tab through the tab aperture and rotating the connector portion with respect to the support portion.

In further accord with embodiments of the invention, the support portion comprises a support joint and the connector portion comprises a connector joint, and a fastener operatively couples the connector portion to the support portion through the support joint and the connector joint.

In other embodiments, the connector portion is made from aluminum, and the support portion is made from plastic.

In yet other embodiments, at least one bracket of the plurality of brackets comprise a cover support portion operatively coupled to a contoured nose of the cover, and a gutter support portion operatively coupled to a lip of the gutter.

In still other embodiments, at least one bracket of the plurality of brackets comprise a cover support portion comprising a louvered recess that receives louvers of the cover.

In other embodiments, at least one bracket of the plurality of brackets comprises a single fastener cavity. The bracket is operatively coupled to a structure using a single fastener extending through the single fastener cavity.

In further accord with embodiments, at least one bracket of the plurality of brackets comprises a cover receiving surface. The cover receiving surface is a concave receiving surface that receives a first end cover projection.

In other embodiments, the cover comprises a first end comprising a contoured nose that receives a cover support portion of the plurality of brackets, a second end for operative coupling with one or more of the plurality of brackets, and an intermediate portion between the first end and the second end having a plurality of louvers.

In yet other embodiments, the plurality of louvers have one or more louver arms that extend towards the gutter when the cover is operatively coupled to the plurality of brackets.

In still other embodiments, the cover comprises a first end comprising a contoured nose that receives a cover support portion of the plurality of brackets and a first end cover projection having a concave projection surface that is received by a concave receiving surface of the plurality of brackets. The cover further comprises a second end, wherein a portion of the second end is operatively coupled to one or more of the plurality of brackets and an intermediate portion between the first end and the second end.

In other embodiments, the system further comprises at least one end cap. The at least one end cap comprises a first portion configured to be operatively coupled to a gutter and a second portion configured to be operatively coupled to the first portion. The second portion is removeable when installed for accessing an interior of the gutter.

Another embodiment of the invention comprises a bracket for a gutter system. The bracket comprising a support portion configured for operative coupling with a gutter and a cover for the gutter. The bracket further comprising a connector portion having a cover engaging portion configured to receive a portion of a cover.

In further accord with embodiments of the invention, the support portion comprises a louvered recess that is configured to receive one or more louvers of the cover.

Another embodiment of the invention comprises a cover for a gutter system. The cover comprising a first end comprising a contoured nose configured to receive a cover support portion of a plurality of brackets, a second end configured for operative coupling to one or more of the plurality of brackets or a rear wall of a gutter, and an intermediate portion between the first end and the second end having a plurality of louvers.

Another embodiment of the invention comprises a method of installing a gutter system. The method comprising assembling a plurality of brackets to a gutter. The plurality of brackets comprise a support portion operatively coupled to a lip of the gutter, and a connector portion operatively coupled to the support portion. The method further comprises assembling a first end of a cover around the support portion of the plurality of brackets and assembling a second end of the cover to the connector portion of the of the plurality of brackets to form the gutter system. The method further comprises lifting the gutter system for installation to a structure and fastening the plurality of brackets to the structure using a single fastener through the plurality of brackets.

To the accomplishment of the foregoing and the related ends, the one or more embodiments of the invention comprise the features hereinafter fully described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF DRAWINGS

The foregoing and other advantages and features of the invention, and the manner in which the same are accomplished, will become more readily apparent upon consideration of the following detailed description of the invention taken in conjunction with the accompanying drawings, which illustrate embodiments of the invention and which are not necessarily drawn to scale, wherein:

FIG. 2 illustrates a gutter of the gutter system, in accordance with some embodiments of the disclosure.

FIG. 9E illustrates a front perspective exploded view of an end cap, in accordance with some embodiments of the disclosure.

DETAILED DESCRIPTION

Embodiments of the present invention may now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Figure 1A:
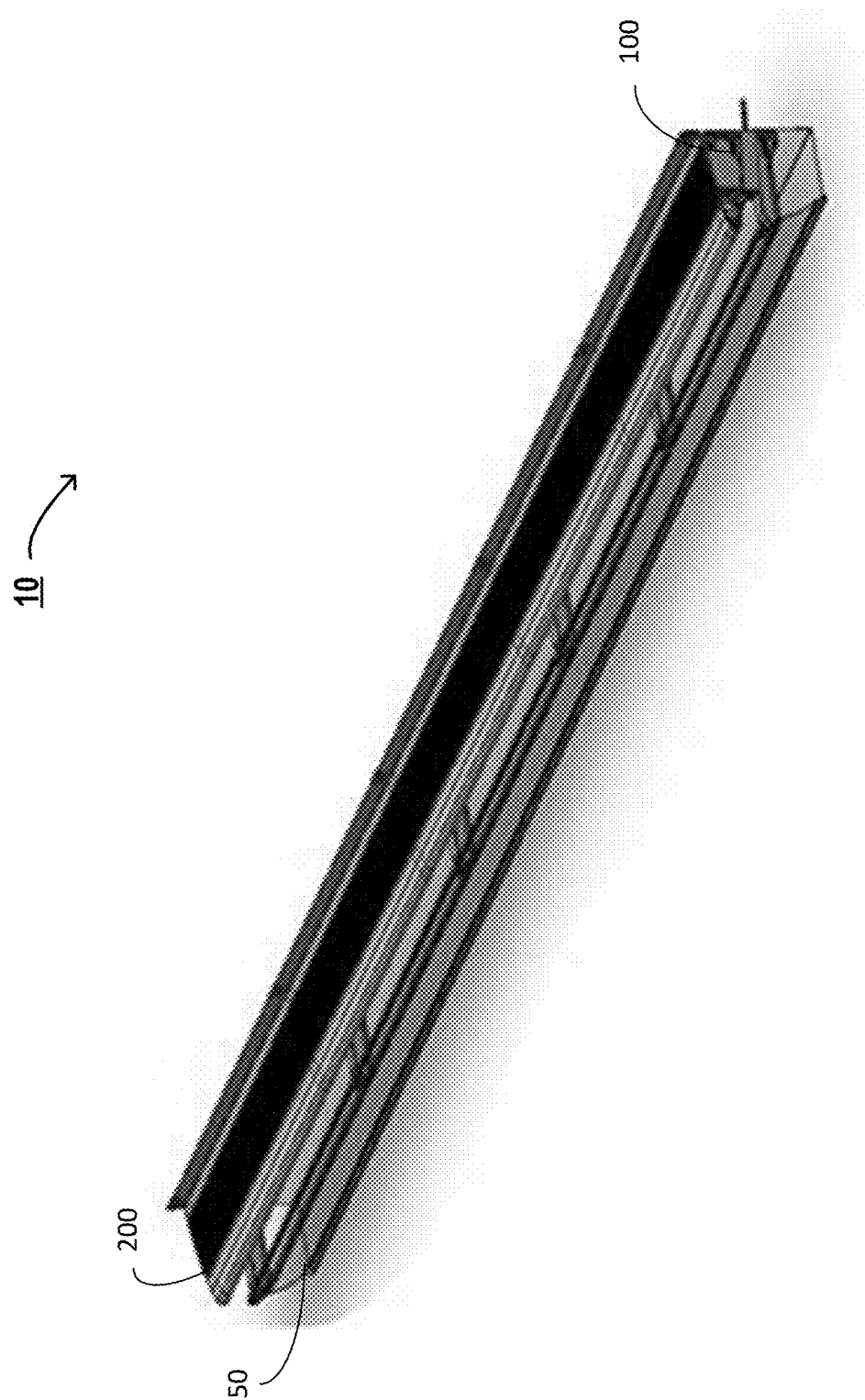
FIG. 1A illustrates a perspective view of a gutter system, in accordance with some embodiments of the disclosure.
Figure 1B:
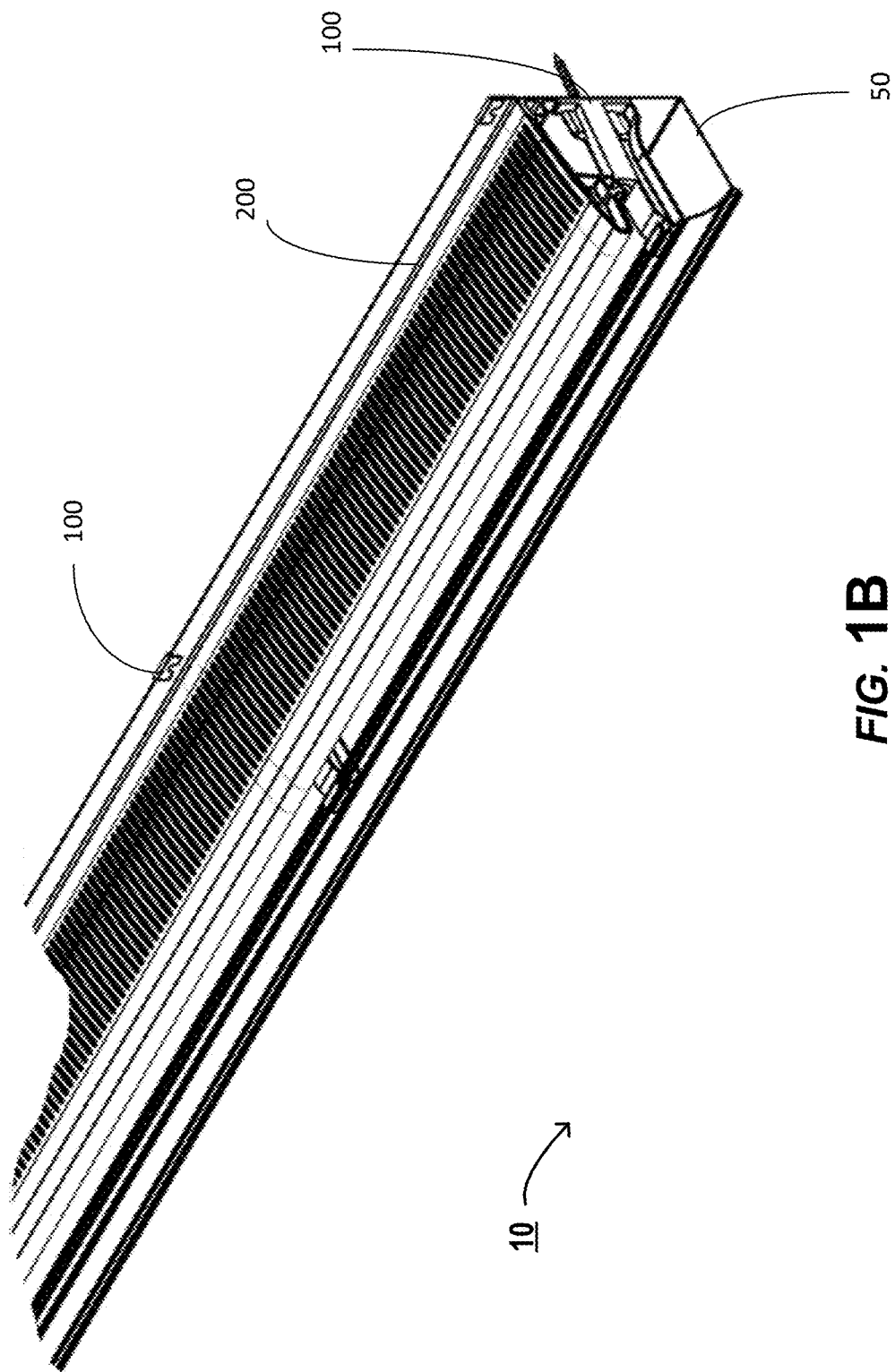
FIG. 1B illustrates an enlarged perspective view of a portion of the gutter system of FIG. 1, in accordance with some embodiments of the disclosure.
Figure 1C:
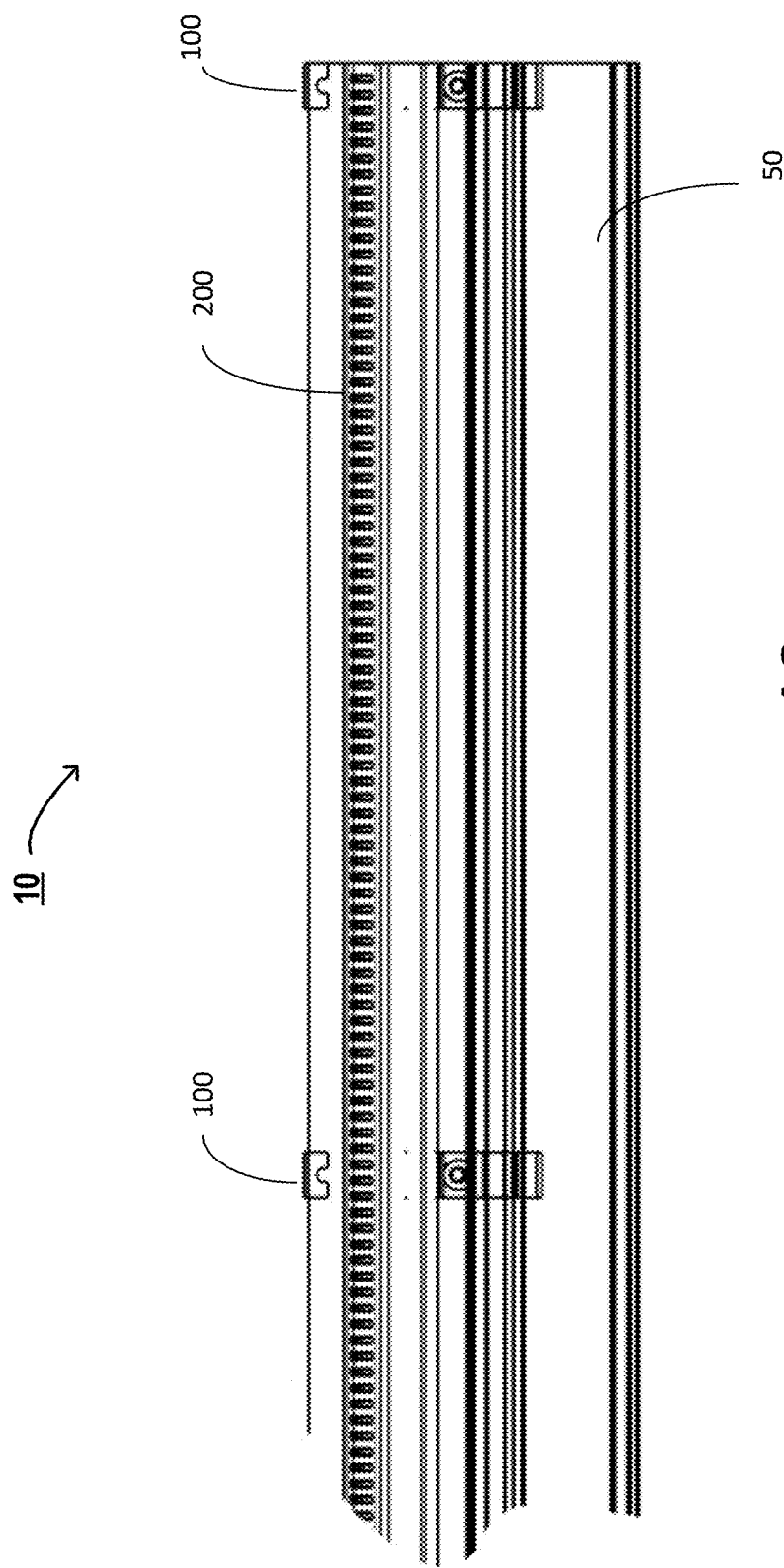
FIG. 1C illustrates a front view of the gutter system, in accordance with some embodiments of the disclosure.
Figure 1D:
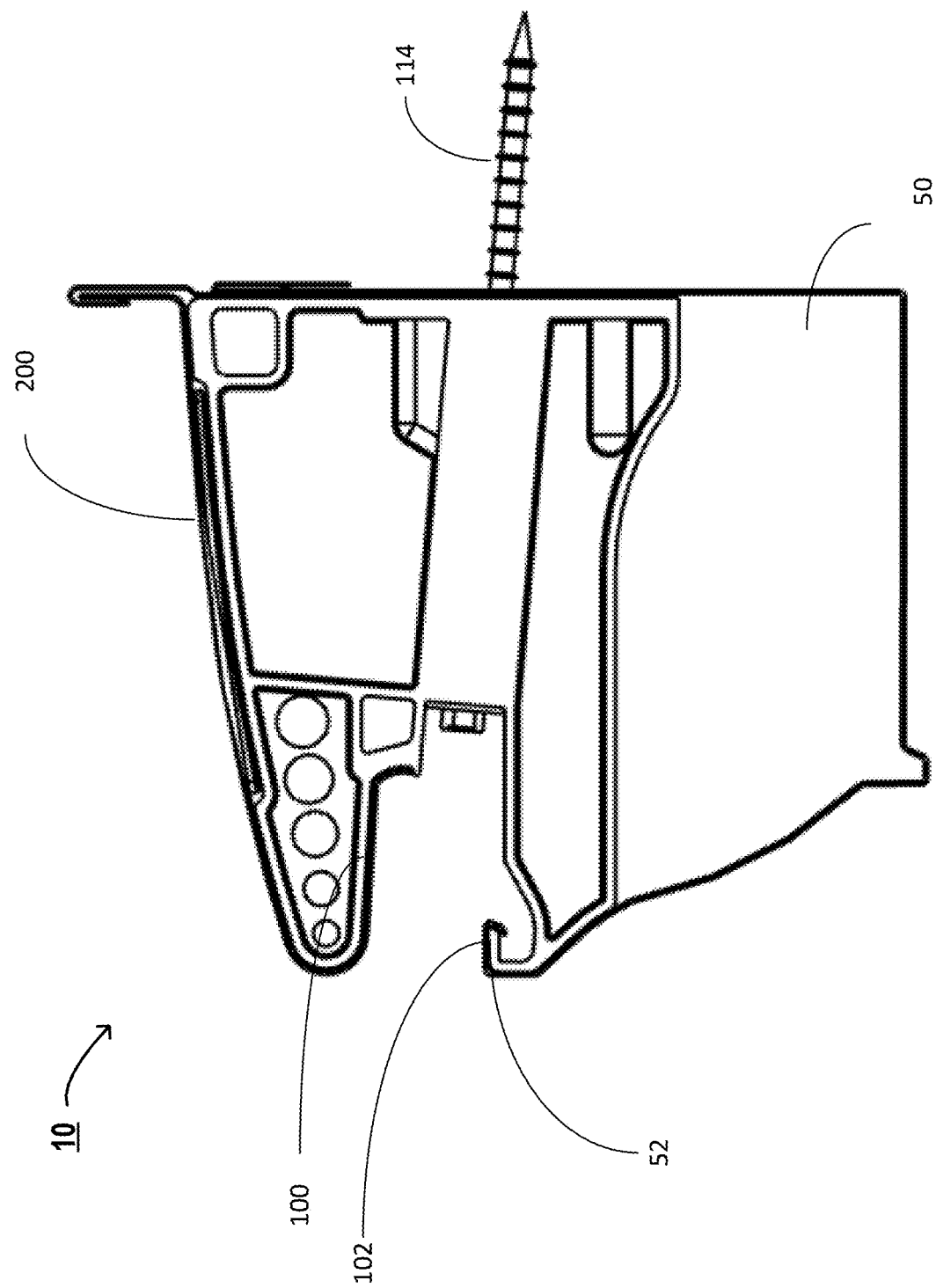
FIG. 1D illustrates a side view of the gutter system, in accordance with some embodiments of the disclosure.

FIG. 1A illustrates a perspective view of a gutter system 10, in accordance with some embodiments of the disclosure. FIG. 1B illustrates an enlarged perspective view of a portion of the gutter system 10 of FIG. 1A, in accordance with some embodiments of the disclosure. FIG. 1C illustrates an enlarged front view of the gutter system 10, in accordance with some embodiments of the disclosure. FIG. 1D illustrates a side view of the gutter system 10, in accordance with some embodiments of the disclosure. As illustrated in FIGS. 1A through 1D, the gutter system 10 comprises a gutter 50 (also described herein as a trough, or gutter trough), a plurality of brackets 100, and a cover 200 that is coupled to the plurality of brackets 100. In some embodiments, the plurality of brackets 100 are at least partially located within the gutter 50. The plurality of brackets 100 are operatively coupled to the gutter 50 and the cover 200 and hold the gutter system 10 in place when operatively coupled (e.g., attached with a fastener, or the like) to a support member of a building or structure, such as a fascia board of a building. FIG. 1D illustrates a side view of the gutter system 10, in accordance with some embodiments of the disclosure. As shown, the gutter 50 is operatively coupled to the bracket 100 via a gutter lip 52 (e.g., a gutter hook, or the like) and a bracket lip 102 (e.g., hook on the end of the bracket, or the like), where the gutter lip 52 mates with the bracket lip 102 to hold the bracket 100 in place. For example, a portion of the gutter hook wraps around a portion of the bracket hook. The gutter system 10 is operatively coupled to a fascia board of a building via a single fastener 114 (e.g., bolt, rivet, screw, or the like) through each of the brackets.

FIG. 2 illustrates a gutter 50 of the gutter system 10, in accordance with some embodiments of the disclosure. The gutter 50 may comprise a front wall 54, a bottom wall 56, a rear wall 58, and the gutter lip 52. The gutter 50 may further comprise a protrusion 60, which forms a surface tension break 62 for interrupting surface tension of rainwater flowing on the outside of the gutter 50, thereby aiding in preventing water from flowing along the bottom wall 56 to the rear wall 58 and contacting part of the structure (e.g., fascia board, or the like of a building) which could damage the structure (e.g., rot the fascia board, or the like). In some embodiments, there may be more than one protrusion 60 that forms more than one surface tension break 62. In some embodiments, the one or more surface tension breaks 62 may be present on the front wall 54 of the gutter 50. In some embodiments, the one or more surface tension breaks 62 may be present on the bottom wall 56. As illustrated, the surface tension break 62 may be located at the intersection between the front wall 54 and the bottom wall 56. The surface tension break 62 may have a first portion 64 that extends downwardly from the front wall 54, a second portion 66 that extends rearwardly towards the rear wall 58, and a third portion 68 that extends upwardly towards the bottom wall 56. In some embodiments, the third portion 68 of the surface tension break 62 is what aids in breaking the surface tension of the water (e.g., the water is unable to move up the third portion 68). While the surface tension break 62 is illustrated as having surfaces that are planer, in other embodiments, the surfaces of the one or more portions of the one or more surface tension breaks 62 may be curved. As such, the one or more surface tension breaks 62 may have any type of shape, such as curvilinear, half-circular, elliptical, triangular, square, rectangular, polygonal, amorphous, or any other shape that is uniform and/or non-uniform, or the like.

Figure 3:
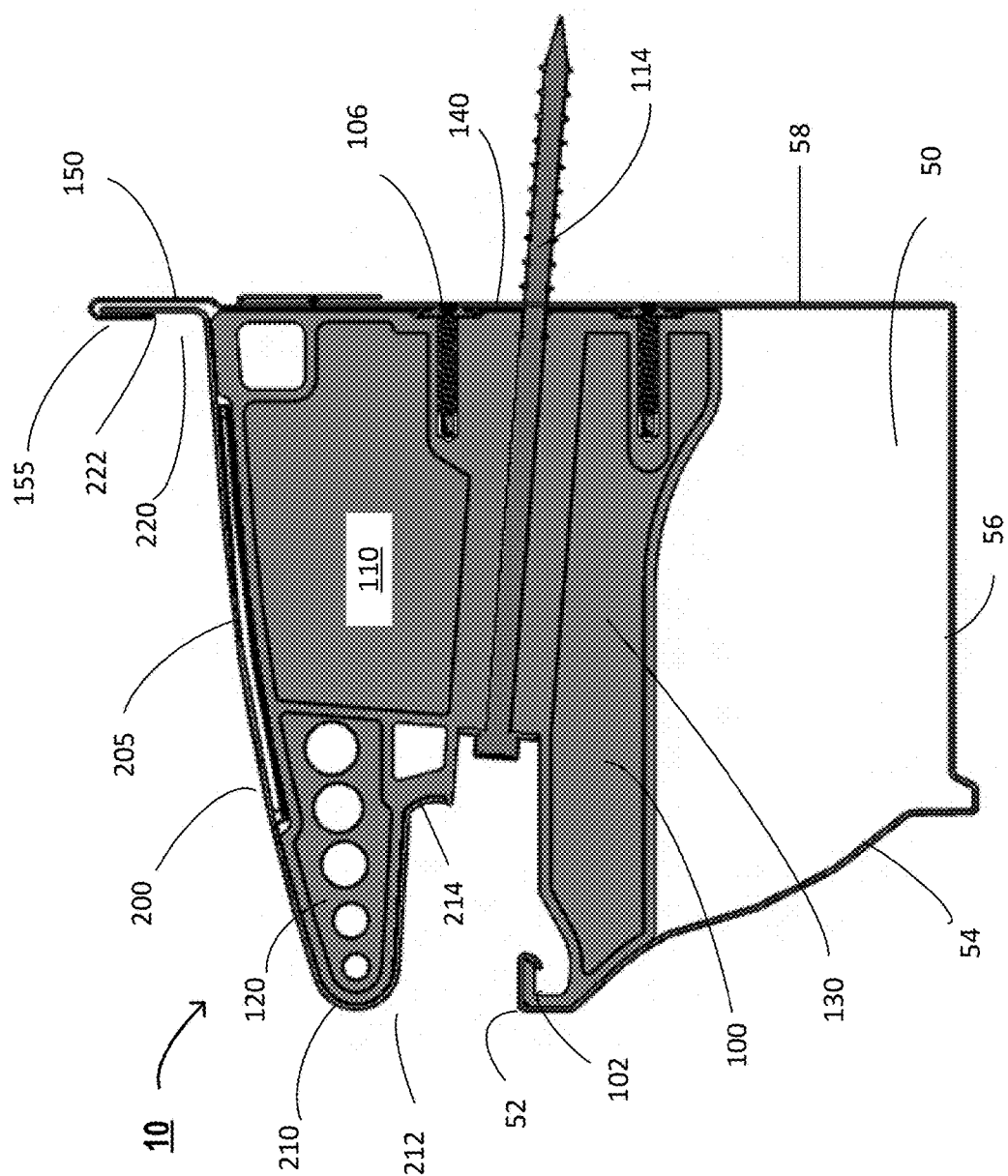
FIG. 3 illustrates a cross-sectional side view of the gutter system, in accordance with some embodiments of the disclosure.

FIG. 3 illustrates a cross-sectional side view of the gutter system 10, in accordance with some embodiments of the disclosure. In some embodiments, the plurality of brackets 100 are operatively coupled to the gutter 50 and the cover 200 is operatively coupled to the plurality of brackets 100 before the plurality of brackets 100 are operatively coupled to a structure using a fastener 114 through the plurality of brackets 100, as will be described with respect to FIG. 10.

Figure 4A:
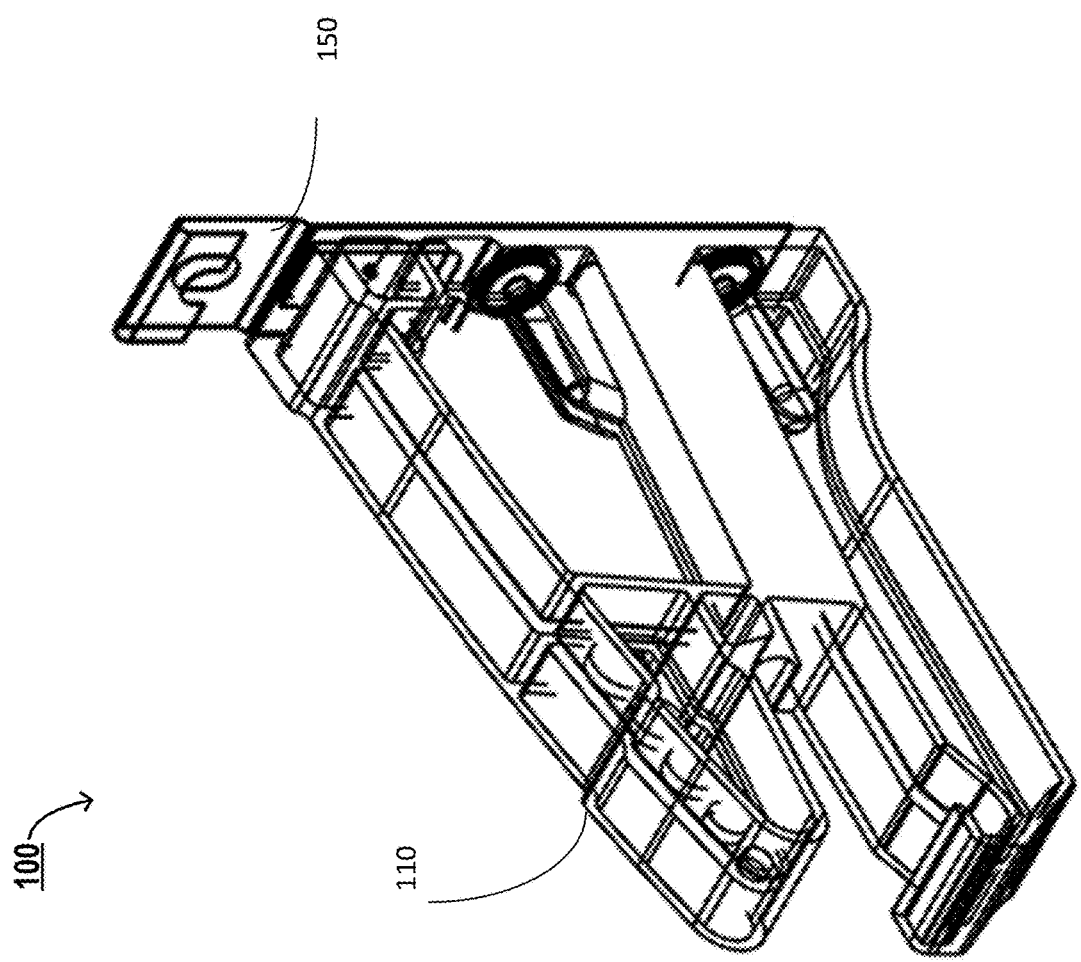
FIG. 4A illustrates a perspective view of a bracket of the gutter system, in accordance with some embodiments of the disclosure.
Figure 4B:
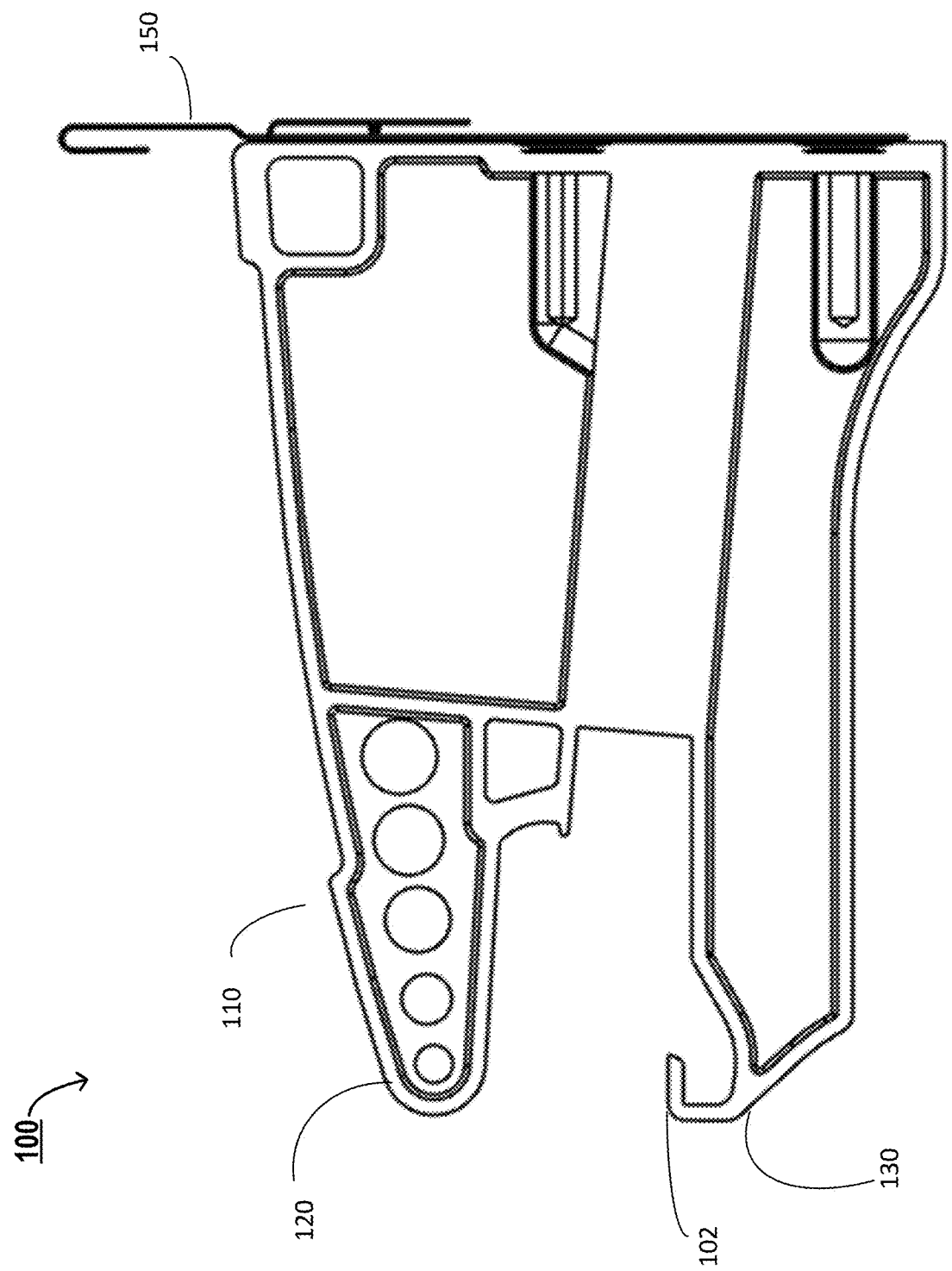
FIG. 4B illustrates a side view of the bracket of the gutter system, in accordance with some embodiments of the disclosure.
Figure 4C:
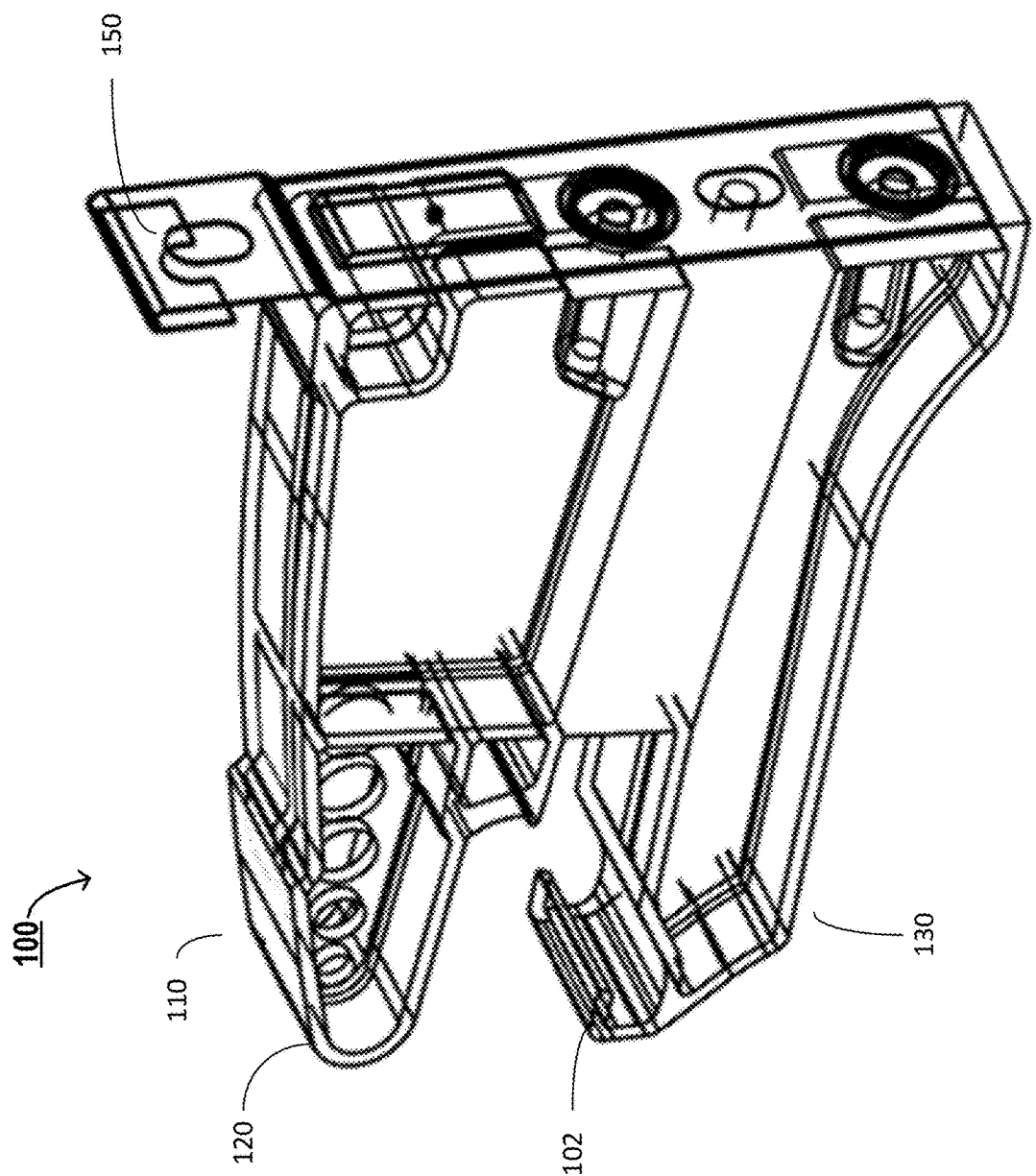
FIG. 4C illustrates a rear perspective view of the bracket of the gutter system, in accordance with some embodiments of the disclosure.

FIGS. 4A through 4G illustrate embodiments of the bracket 100, as well as the support portion 110 and connector portion 150 of the bracket. FIG. 4A illustrates a perspective view of a bracket 100 of the gutter system 10, in accordance with some embodiments of the disclosure. FIG. 4B illustrates a side view of the bracket 100 of the gutter system 10, in accordance with some embodiments of the disclosure. FIG. 4C illustrates a rear perspective view of the bracket 100 of the gutter system 10, in accordance with some embodiments of the disclosure. The bracket 100 comprises a support portion 110 and a connector portion 150. The support portion 110 is used to operatively couple the bracket to the gutter 50, and to support the cover 200, as will be discussed in further detail herein. The connector portion 150 operatively couples the bracket 100 to the cover 200, and in some embodiments to the gutter 50, as will be discussed in further detail herein. The bracket 100 (e.g., support portion 110 and the connector portion 150, or the like) may be made of any material, such as plastic, aluminum, steel, other metals, composites, or the like, or combinations thereof. In some embodiments, the support portion 110 and the connector portion 150 may be formed integrally with each other, while in other embodiments, the support portion 110 and the connector portion 150 may be separate parts that are assembled together. In some embodiments, connector portion 150 is operatively coupled to the support portion 110 via fasteners (e.g., bolts, rivets, screws, or the like). In some embodiments, the connector portion 150 and the support portion 110 are welded together. In some embodiments, the connector portion 150 is made of aluminum and the support portion 110 is made of plastic. In other embodiments, the connector portion 150 may be formed with the support portion 110 when it is injected molded. Alternatively, the support portion 110 may have one or more projections (e.g., plastic studs, or the like) that extend outwards from the support portion 110. The connector portion 150 may be assembled around the projections, and the studs may be deformed (e.g., mechanically, using heat, or the like) in order to operatively couple the connector portion 150 to the support portion 110. In still other embodiments the connector portion 150 may be assembled using at least one projection and at least one fastener, as will be discussed in further detail herein.

Figure 4D:
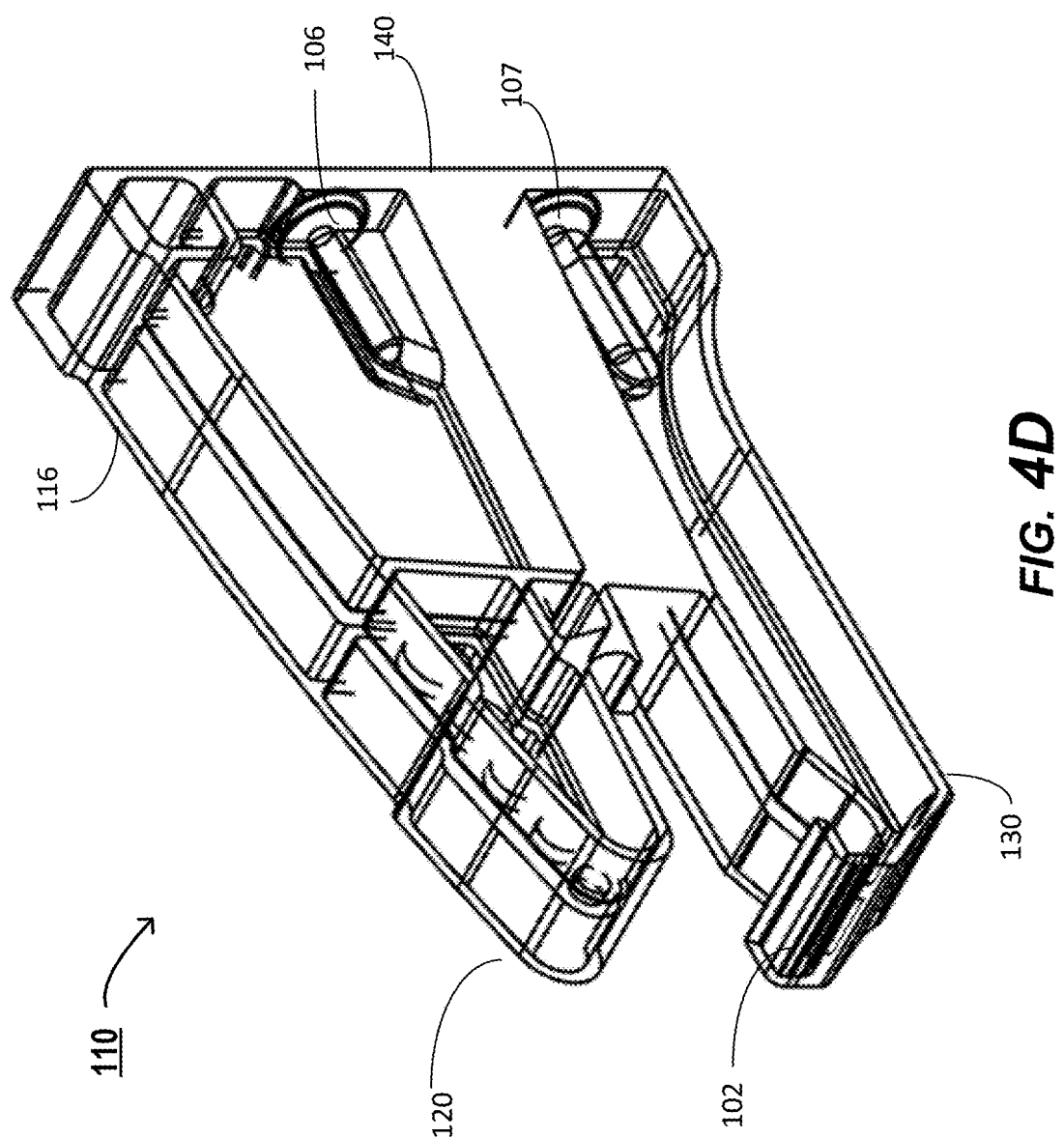
FIG. 4D illustrates a top perspective view of the support portion of the bracket of the gutter system, in accordance with some embodiments of the disclosure.

FIG. 4D illustrates a top perspective view of the support portion 110 of the bracket 100 of the gutter system 10, in accordance with some embodiments of the disclosure. As shown, the support portion 110 of the bracket 100 comprises a cover support portion 120, a gutter support portion 130, and a rear support portion 140. The cover support portion 120 is configured for operative coupling with the cover 200, for example, the support portion 120 engages with the cover 200 of the gutter system 10, as will be described in further detail herein. The gutter support portion 130 is configured for operative coupling with the gutter 50, for example, as previously discussed the bracket lip 52 engages with the gutter lip 52 of the gutter 50. The rear support portion 140 is configured for operatively coupling with the gutter 50, for example, at least a portion of the rear support portion 140 engages with at least a portion of the rear wall 58 of the gutter 50.

Figure 4E:
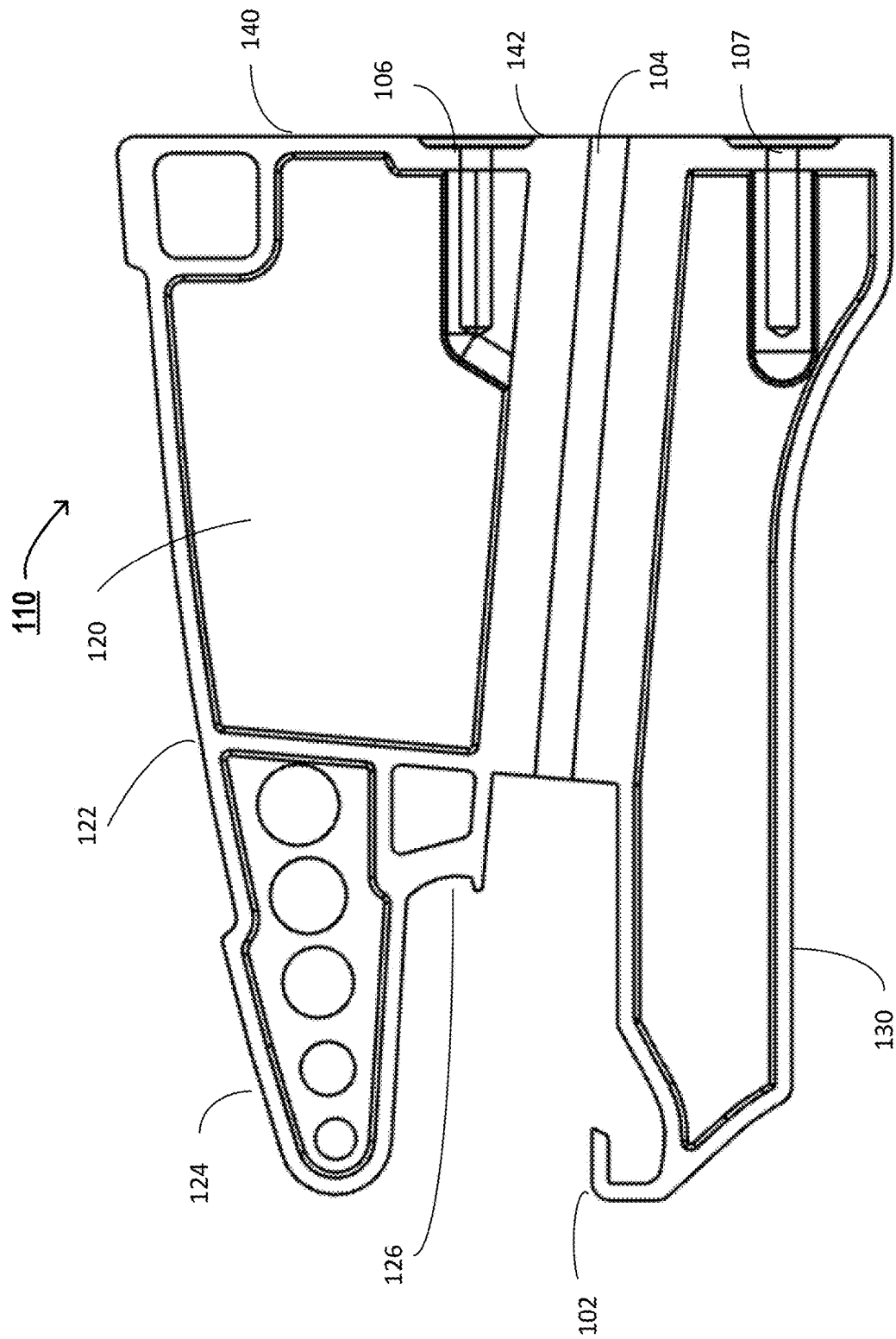
FIG. 4E illustrates a side view of the support portion of the gutter system, in accordance with some embodiments of the disclosure.

FIG. 4E illustrates a side view of the support portion 110 of the bracket 100, in accordance with some embodiments of the disclosure. As shown, the cover support portion 120 of the bracket 100 may comprise a louver recess 122, a nose support 124, and/or a cover end receiving surface 126. The louver recess 122 of the support portion 120 is configured for receiving louvers 205 of the cover 200. The nose support 124 of the support portion 120 is configured for supporting the contoured nose 212 of the cover 200. The cover receiving surface 126 is configured for receiving a first end 210 (e.g., a first end projection 214) of the cover 200. The louver recess 122 is a cavity that receives the louvers 205 of the cover 200 such that the cover 200 is smooth across the top without anything protruding from the outer surface of the cover 200. The nose support 124 may have a contoured surface that mates with the contoured nose 212 of the cover 200. In some embodiments, the cover receiving surface 126 is a concave receiving surface that is configured to receive a first end cover projection 214 of the cover 200, as will be discuss in further detail herein.

As shown, the gutter support portion 130 comprises the bracket lip 102, which operatively couples the bracket 100 to the gutter lip 52 of the gutter 50. The bracket 100 further comprises a fastener cavity 104 (e.g., a single fastener cavity through the cover support portion 120, the gutter support portion 130, the rear support portion 140, another portion, or the like). In some embodiments, a fastener 20 (e.g., a single fastener) passes through the single fastener cavity 104 and operatively couples the bracket 100 to a support member of a structure (e.g., fascia board of the building, or the like). In some embodiments, the support portion 110 comprises one or more support joints 106, 107 (e.g., one or more fastener receiving cavities for receiving fasteners, one or more projections, such as studs, or the like) which allow for operatively coupling the connector portion 150 to the support portion 110. At least a portion of the rear support portion 140 (e.g., rear bracket wall 142 of the bracket 100) may butt up against the rear wall 58 of the gutter 50. As such, the bracket lip 102 of the support portion 130 and the rear support portion 140 may hold the bracket 100 in place within the gutter 50.

Figure 4G:
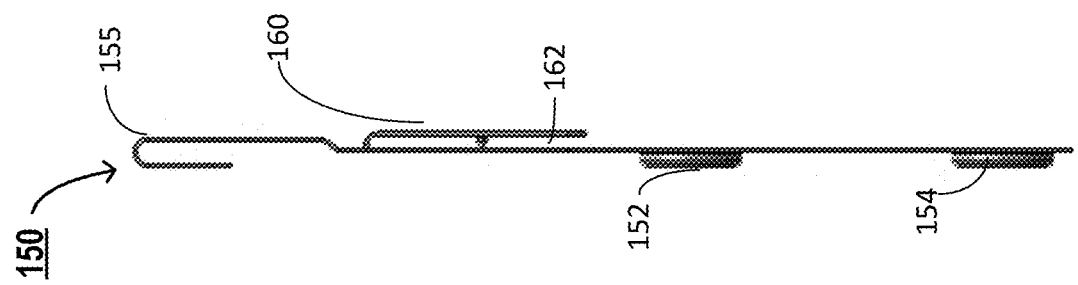
FIG. 4G illustrates a side view of the connector portion of the bracket, in accordance with some embodiments of the disclosure.
Figure 4F:
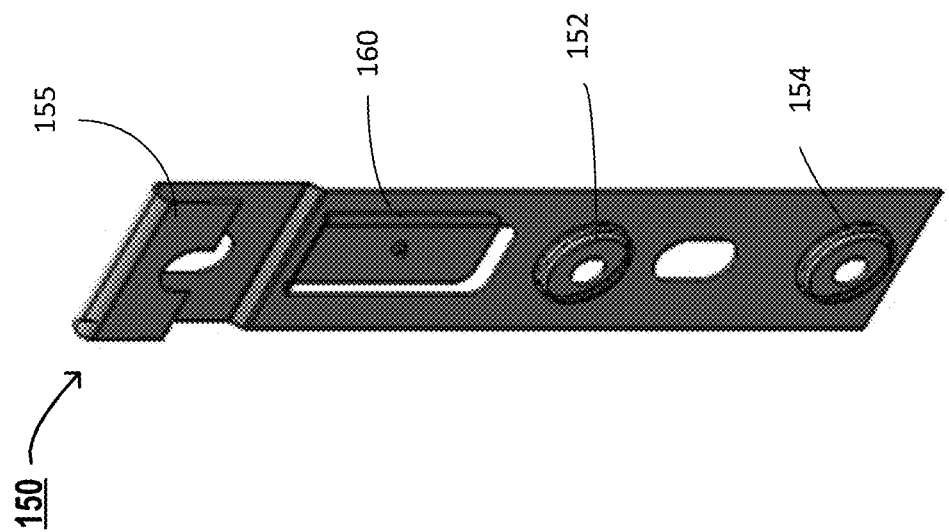
FIG. 4F illustrates a perspective view of a connector portion of the bracket, in accordance with some embodiments of the disclosure.

FIGS. 4F and 4G illustrate a perspective view of the connector portion 150 of the bracket 100, in accordance with some embodiments of the present disclosure. In some embodiments, the connector portion 150 is made of aluminum; however, it should be understood that it may be made of any material. In some embodiments, the connector portion 150 allows assembly of the brackets 100 to the gutter 50 and/or the cover 200 to the brackets 100, such that the gutter system 10 may be pre-assembled while on the ground and thereafter assembled to a structure, as will be described in further detail with respect to FIG. 10. The connector portion 150 may comprise a cover engaging portion 155, a gutter hanger portion 160, and at least one connector joint 152, 154 (e.g., fastener apertures, one or more protrusions, or the like). The cover engaging portion 155 is configured to receive a portion of the cover 200 (e.g., a second end cover projection 222 of the cover 200, or the like). In some embodiments, the cover receiving portion 155 may be a hook, where the hook receives a portion of the cover 200. In some such embodiments, the cover receiving portion 155 may be deformed (e.g., squeezed, crimped, or the like) in order to operatively couple the cover 200 and the bracket 100, as will be described in further detail with respect to FIG. 10. In some embodiments, the cover receiving portion 155 may further comprise fasteners for coupling the cover 200 and bracket 100.

FIGS. 4F and 4G further illustrate that in some embodiments the gutter hanger portion 160 is configured to be operatively couple to a portion of the gutter 50, such as a portion of the rear wall 58 (e.g., top edge of the rear wall) of the gutter 50. In some embodiments, the gutter hanger portion 160 may be a punch out or a tab that extends from the connector portion 150 to create a hanger cavity 162 that receives the rear wall 58 of the gutter 50. In some embodiments, the gutter hanger portion 160 may slide over the end of the rear wall 58 of the gutter 50. In other embodiments, a portion of the rear wall 58 (e.g., punch out, tab, folded end of the rear wall 58, or the like) may be utilized to operatively couple the gutter hanger portion 160 of the connector portion 150 to the gutter 50.

FIGS. 5 and 6A through 6F illustrate alternate embodiments of the brackets 100 similar to the embodiments of the bracket 100 illustrated in FIGS. 3 and 4A through 4G. As illustrated in FIGS. 5 and 6A through 6F, the bracket 100 comprises a support portion 110 and a connector portion 150. The support portion 110 is used to operatively couple the bracket to the gutter 50 as previously discussed, and to support the cover 200. The connector portion 150 operatively couples the bracket 100 to the cover 200, as will be discussed in further detail herein. As shown, the support portion 110 of the bracket 100 comprises a cover support portion 120, a gutter support portion 130, and a rear support portion 140. The cover support portion 120 is configured for operative coupling with the cover 200, for example, the support portion 120 engages with the cover 200 of the gutter system 10, as will be described in further detail herein. The gutter support portion 130 is configured for operative coupling with the gutter 50, for example, as previously discussed the bracket lip 102 engages with the gutter lip 52 of the gutter 50.

Figure 5:
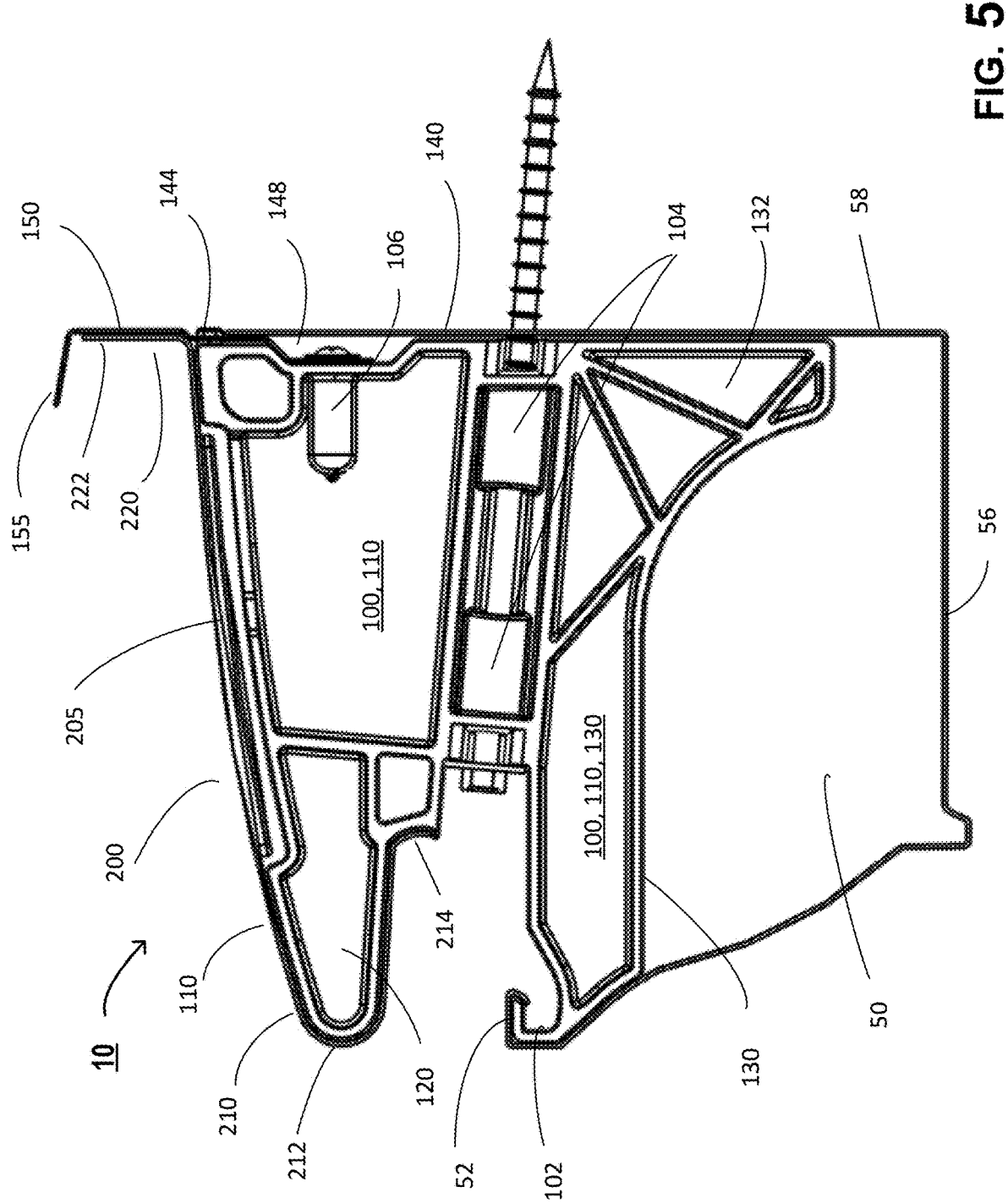
FIG. 5 illustrates a side view of the gutter system, in accordance with some embodiments of the disclosure.
Figure 6A:
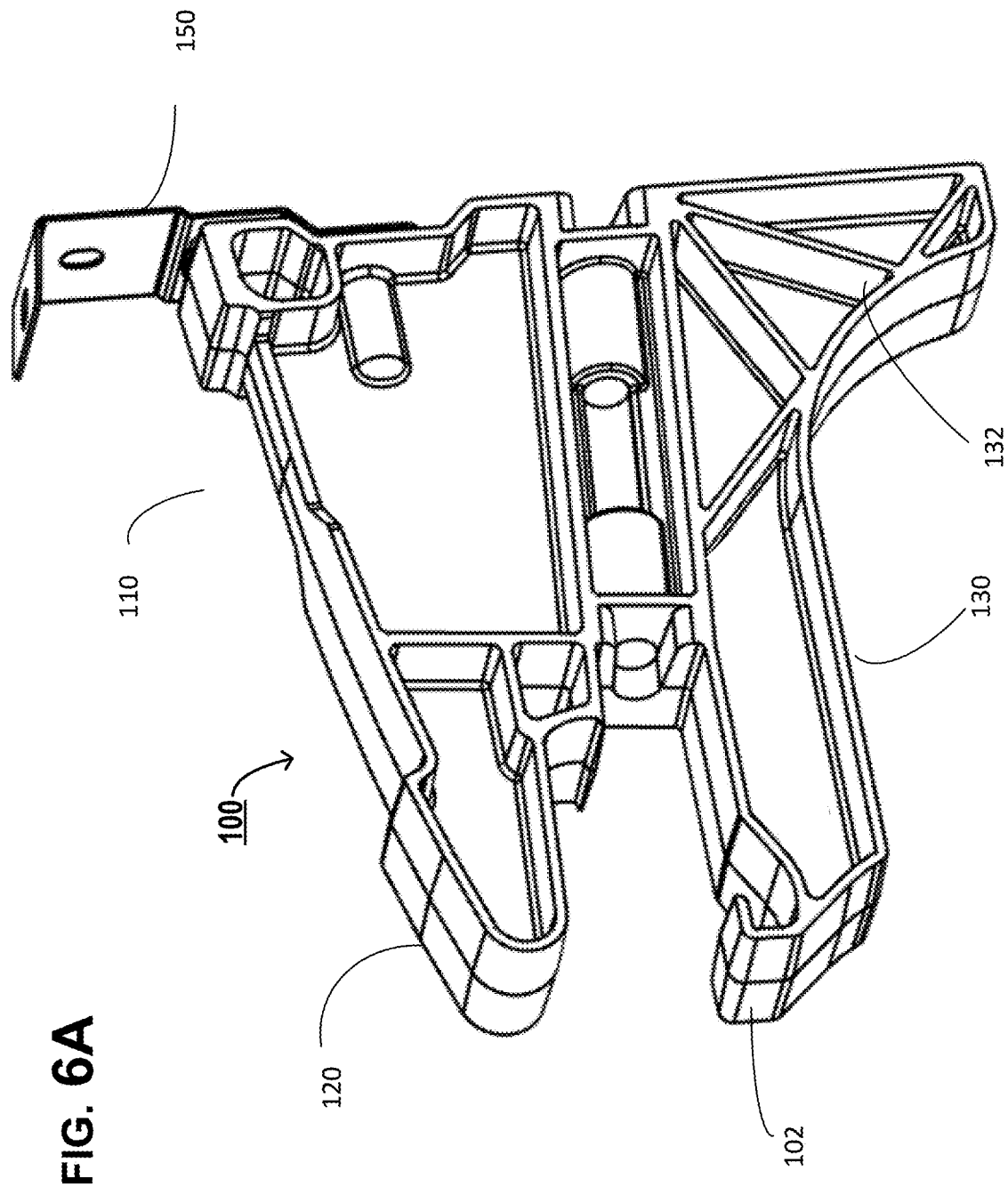
FIG. 6A illustrates a perspective view of a bracket of the gutter system, in accordance with some embodiments of the disclosure.

As illustrated in FIGS. 5 and 6A through the gutter support portion 130 may further comprise a gutter support projection 132, which when installed extends downwardly into the gutter 50. In some embodiments the gutter support projection 132 may or may not interact (e.g., touch, or the like) the bottom wall 56 of the gutter 50. The rear support portion 140 is configured for operatively coupling with the gutter 50, for example, at least a portion of the rear support portion 140 engages with at least a portion of the real wall 58 of the gutter 50. In some embodiments the gutter support projection 132 may extend the length of the rear support portion 140, and thus, extends the portion of the rear support portion 140 that may be operatively coupled to (e.g., engage with, or the like) the rear wall 58 of the gutter 50. As such, the bracket 100 may be secured within the gutter 50 by the bracket lip 102 and the rear support portion 140 (e.g., with or without the gutter support projection 132) engaging with the rear wall 58 of the gutter 50 without the need for the connector portion 150 to be operatively coupled to the gutter 50 (e.g., without the need for the gutter hanger portion 160 described with respect to FIGS. 3 and 4A through 4G).

Figure 6B:
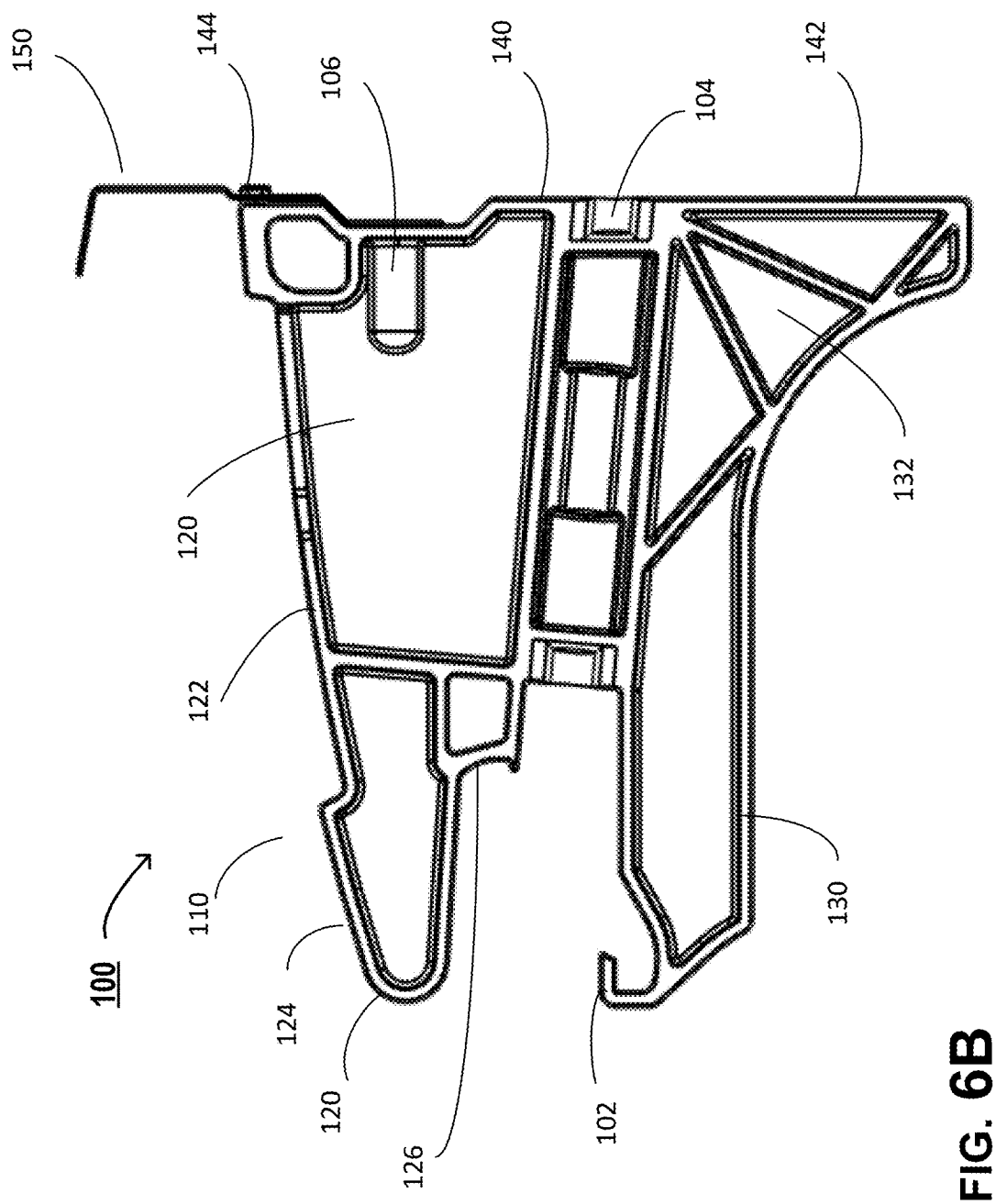
FIG. 6B illustrates a side view of the bracket of the gutter system, in accordance with some embodiments of the disclosure.
Figure 6C:
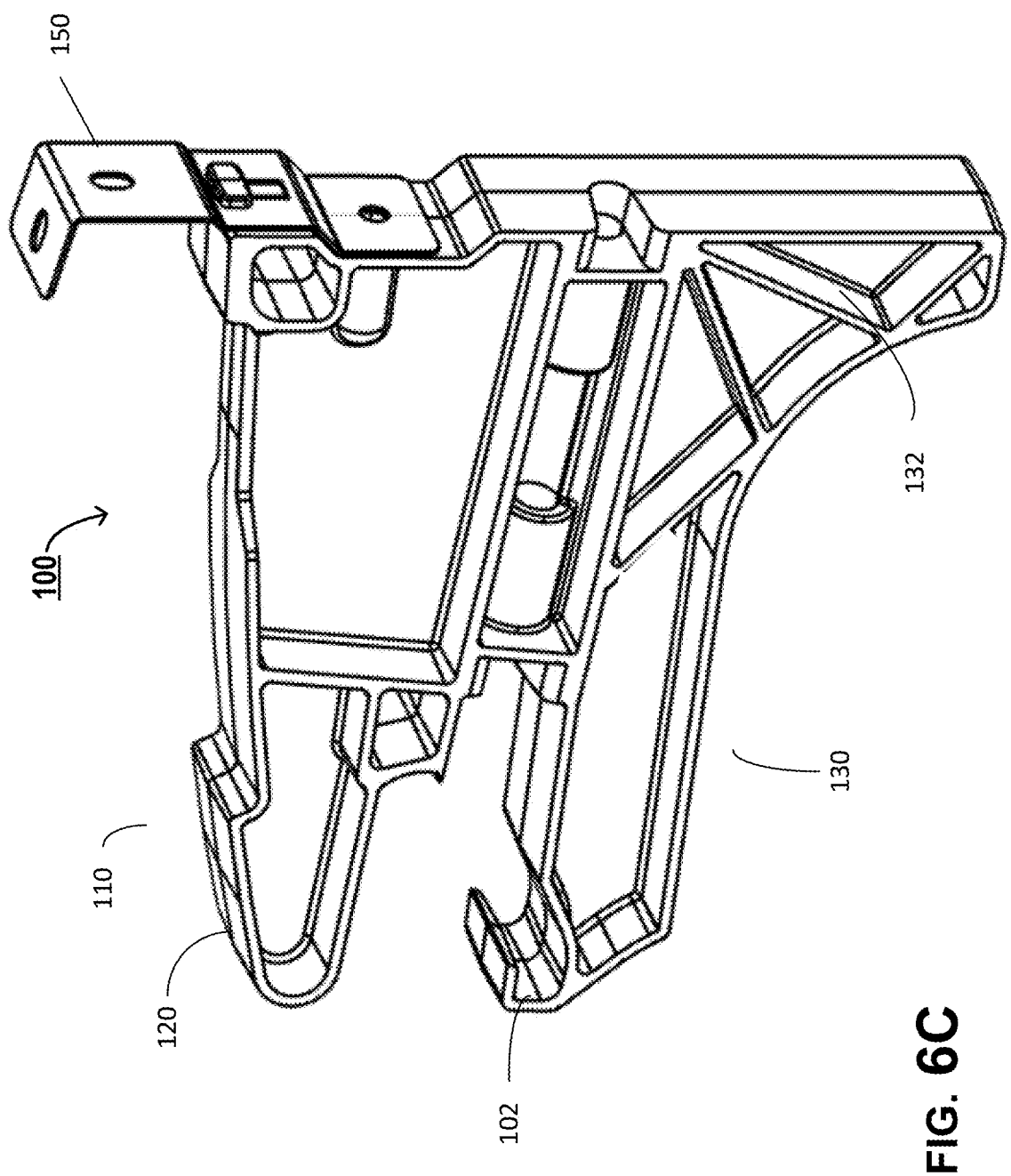
FIG. 6C illustrates a rear perspective view of the bracket of the gutter system, in accordance with some embodiments of the disclosure.
Figure 6D:
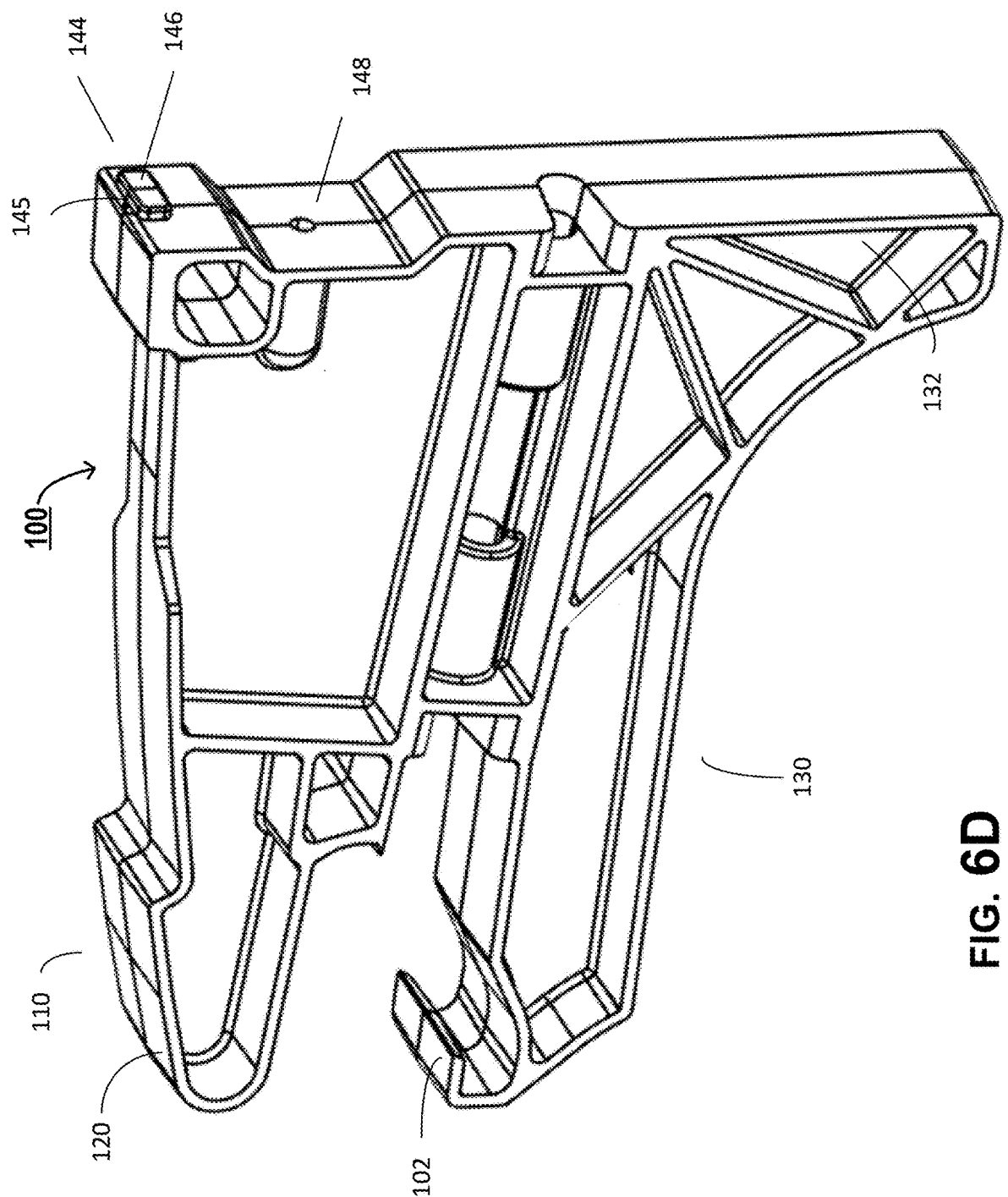
FIG. 6D illustrates a rear perspective view of the support portion of the bracket of the gutter system, in accordance with some embodiments of the disclosure.

FIGS. 5 and 6A through 6D further illustrate that the cover support portion 120 and the gutter support portion 130 may be the same as or similar to the bracket 100 described with respect to FIGS. 3 and 4A through 4E. However, the rear support portion 140 and/or the connector portion 150 in FIGS. 5 and 6A through 6F may be different. For example, the rear support portion 140 having the rear bracket wall 142 may have one or more rear wall projections 144 (e.g., tab, pin, stud, or the like). As illustrated in FIGS. 6B through 6D, the rear wall projection 144 may be operatively coupled to the real bracket wall 140 (e.g., integrally formed with, from separate and attached thereto, or the like). The rear wall projection 144 is illustrated as a tab that has a neck 145 and one or more flanges 146 extending past the neck. However, it should be understood that the rear wall projection 144 may have any type of shape and/or configuration that allows for operative coupling with the connector portion 150. It should be understood that the real wall projection 144 may be flush with (e.g., in the same plane as) the rear bracket wall 142, such that when the bracket 100 is installed within a gutter 50 the rear wall projection 144 may butt up against the rear wall 58 of the gutter 50. In other embodiments, the rear wall projection 144 may extend past the rear bracket wall 142 and may either butt up against the rear wall 58 of the gutter 50, or in some embodiments may overhang and/or rest on top of an edge of the rear wall 58 of the gutter 50 (as illustrated in FIG. 5).

In some embodiments, it should be further understood that the rear bracket wall 142 may have one or more recesses 148 (e.g., cutouts, concave areas, counter bores, depressions, or the like), such as at the location of the one or more support joints 106. As such, as illustrated in FIG. 5, when the connector portion 150 is operatively coupled to the support portion 110 using one or more fasteners, the one or more fasteners may be located inset of the rear bracket wall 142 that interfaces with the rear wall 58 of the gutter 50.

Figure 6F:
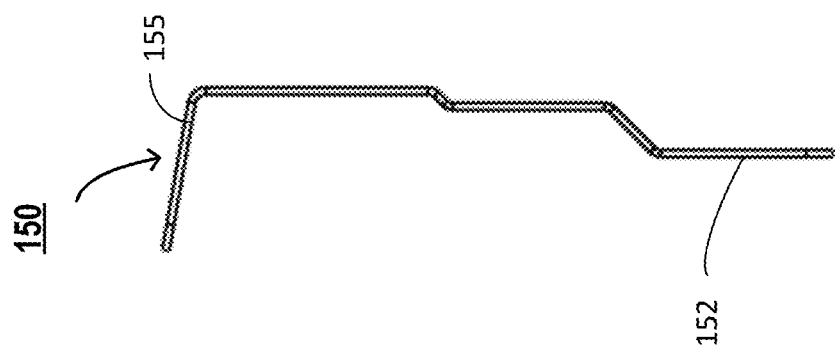
FIG. 6F illustrates a side view of the connector portion of the bracket, in accordance with some embodiments of the disclosure.
Figure 6E:
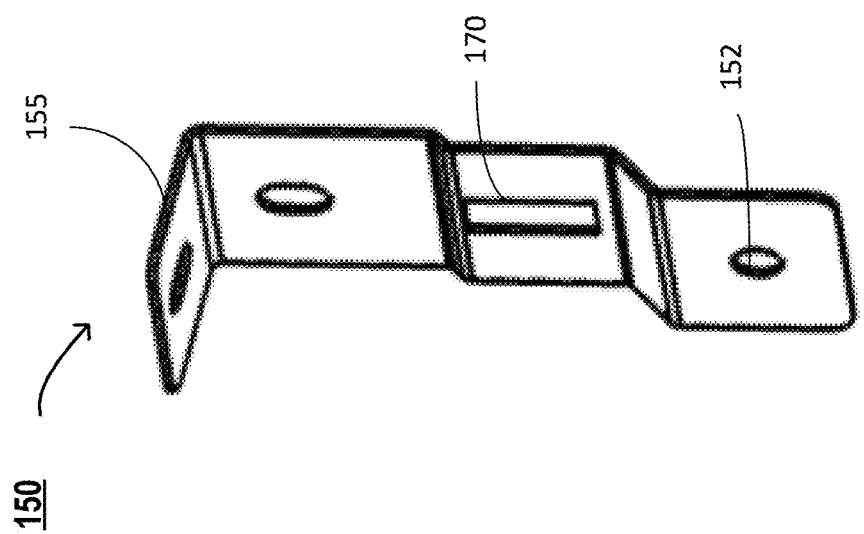
FIG. 6E illustrates a perspective view of a connector portion of the bracket, in accordance with some embodiments of the disclosure.

FIGS. 6E and 6F illustrate perspective and side views of the connector portion 150 of the bracket 100, in accordance with some embodiments of the disclosure. The connector portion 150 illustrated in FIGS. 6E and 6F is similar to the connector portion 150 illustrated in, and described with respect to, FIGS. 4F and 4E. However, as illustrated in FIGS. 6E and 6F, the connector portion 150 may include one or more connector projection apertures 170, which may have a similar shape (e.g., illustrated as rectangular, but may be any shape) as the rear wall projection 144 of the support portion 110 of the bracket 100. As such, the connector portion 150 may be placed over the rear wall projection 144 through the projection aperture 170, and then rotated to aid in locking the connector portion 150 in place in the proper orientation. Once rotated, the connector portion 150 may not be removed unless rotated back to its original position or further rotated to another position. Moreover, as previously discussed, the connector portion 150 may also have one or more connector joints 152 (e.g., fastener apertures, projections, or the like) such that a fastener may be used through the connector joint 152 and a support joint 106 to aid in restricting further rotation of the connector portion 150. In some embodiments, the connector portion 150 may not require rotation, and instead the one or more rear wall projections 144 (e.g., studs, pins, or the like) and/or one or more fasteners may be used to position and operatively coupled the connector portion 150 to the support portion 110 of the bracket 100.

As illustrated in FIGS. 5 and 6B, the connector portion 150 may have a profile, such that at least a portion of the connector portion 150 may confirm to the profile of at least a portion of the rear bracket wall 142. For example, the connector portion 150 may have surfaces that conform with the one or more recesses 148 of the rear bracket wall 142. The profile of the connector portion 150 and the rear bracket wall 142 may aid in orienting the connector portion 150 with the support portion 110 of the bracket 100.

Furthermore, as illustrated in FIG. 5, the connector portion 150 allows assembly of the brackets 100 to the cover 200, such that the gutter system 10 may be pre-assembled while on the ground and thereafter assembled to a structure, as will be described with respect to FIG. 10. As illustrated in FIGS. 5, 6E, and 6F it should be understood that the connector portion 150 may comprise a cover engaging portion 155 that is in an open receiving position. As such, when the cover 200 is assembled over the support portion 110 of the bracket the cover engaging portion 155 may extend past the second end cover projection 222 of the cover 200, and thereafter may be deformed (e.g., squeezed, crimped, or the like) in order to operatively couple the cover 200 and the bracket 100 to improve the ease of installation of the cover 200 with the plurality of brackets 100, as will be described in further detail with respect to FIG. 10. In some embodiments, the cover receiving portion 155 may further comprise fasteners for coupling the cover 200 and bracket 100.

It should be understood that while embodiments of the invention illustrated and described herein indicate that the one or more rear wall projections 144 extend from the support portion 110 of the bracket 100 and are used for operative coupling with one or more connector projection apertures 170 of the connector portion 150 of the bracket 100; however, this configuration can be reversed. That is, the rear bracket wall 142 of the support portion 110 may have one or more projection apertures used to receive projections, and the connector portion 150 may have one or more projections that extend into the one or more projection apertures. Moreover, the connector portion 150 may or may not rotate with respect to the support portion 110, and may or may not use fasteners to operatively couple the connector portion 150 to the support portion 110.

Figure 7A:
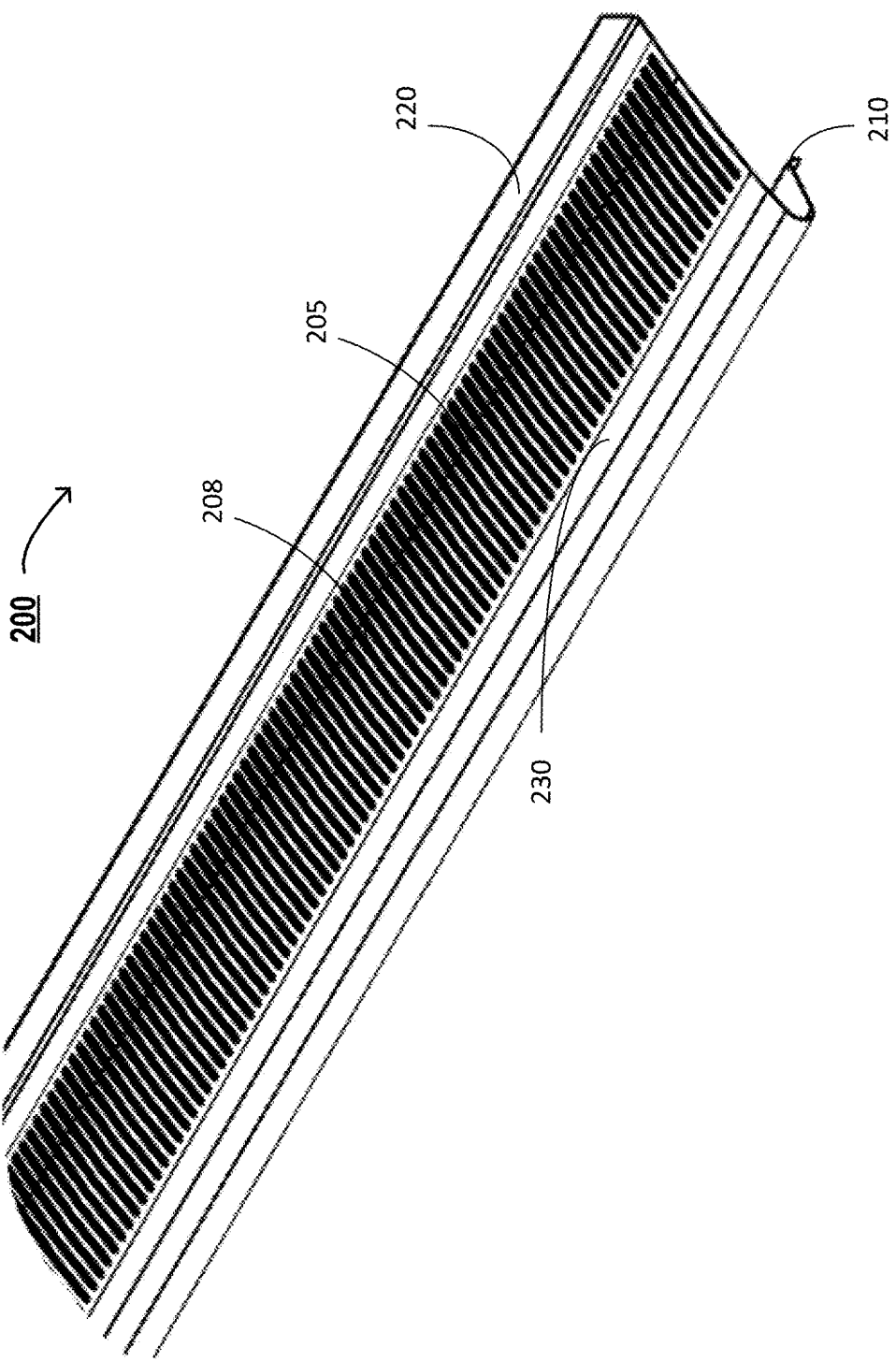
FIG. 7A illustrates a perspective view of a cover of the gutter system, in accordance with some embodiments of the disclosure.

FIG. 7A illustrates a perspective view of the cover 200 of the gutter system 10, in accordance with some embodiments of the disclosure. As shown, the cover 200 comprises a first end 210, a second end 220, and an intermediate portion 230 between the first end 210 and the second end 220. The first end 210 of the cover 200 receives the cover support portion 120 (e.g., a nose support 124) of the plurality of brackets 100. The second end 220 is operatively coupled to one or more of the plurality of brackets 100, such as through the connector portion 150 of the plurality of brackets 100.

Figure 7B:
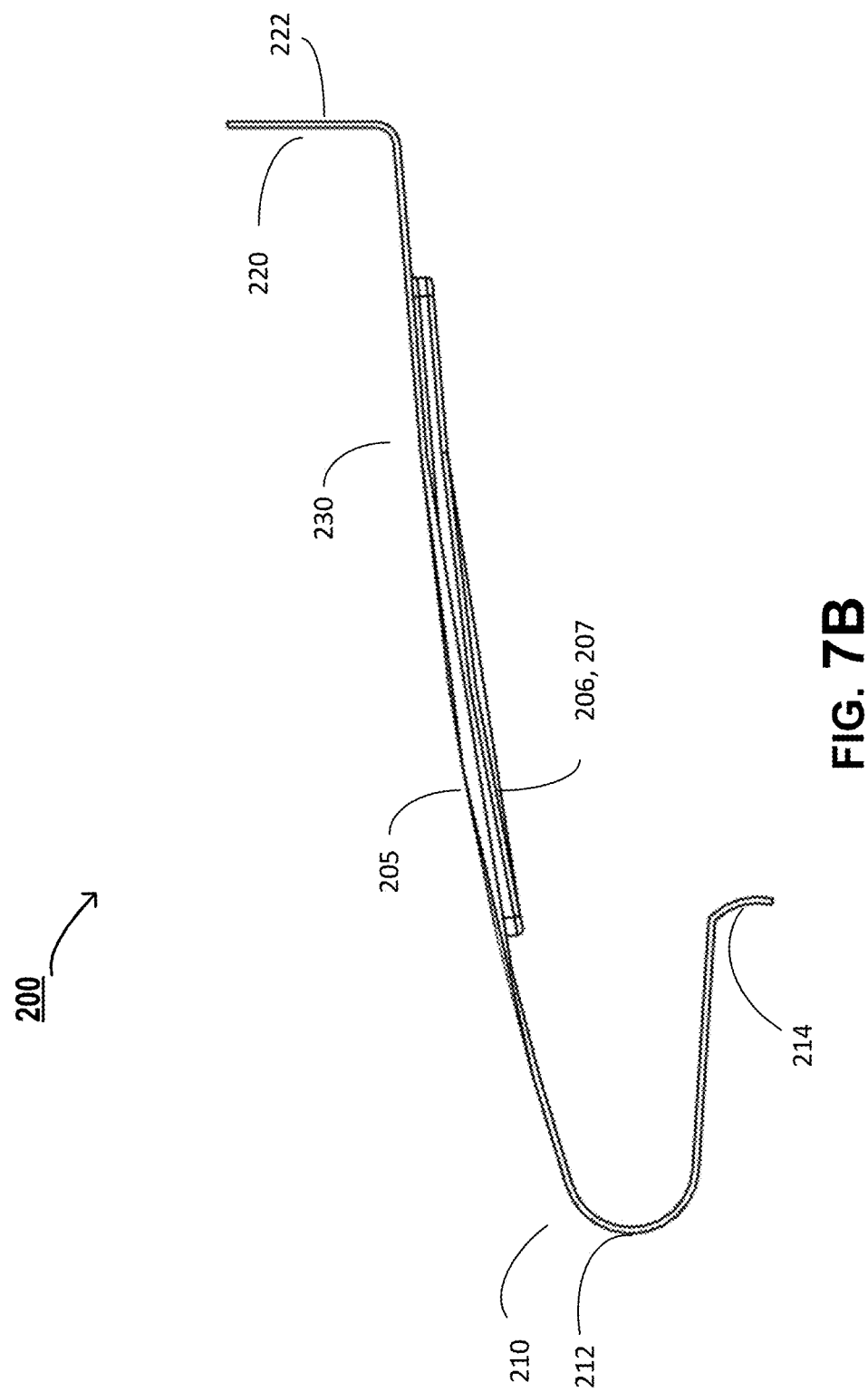
FIG. 7B illustrates a side view of the cover of the gutter system, in accordance with some embodiments of the disclosure.
Figure 8A:
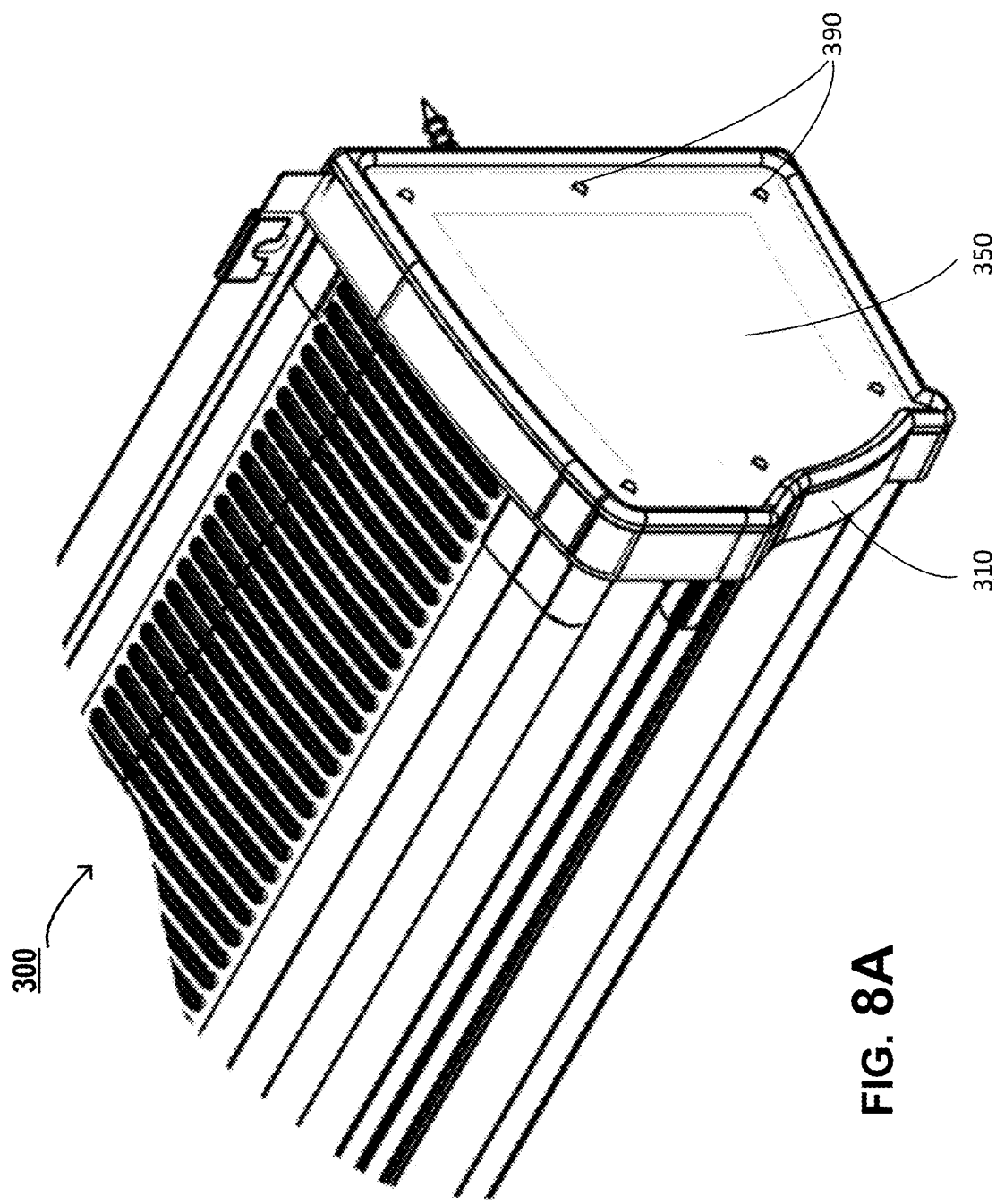
FIG. 8A illustrates a perspective view of an end cap installed on the gutter system, in accordance with some embodiments of the disclosure.
Figure 8B:
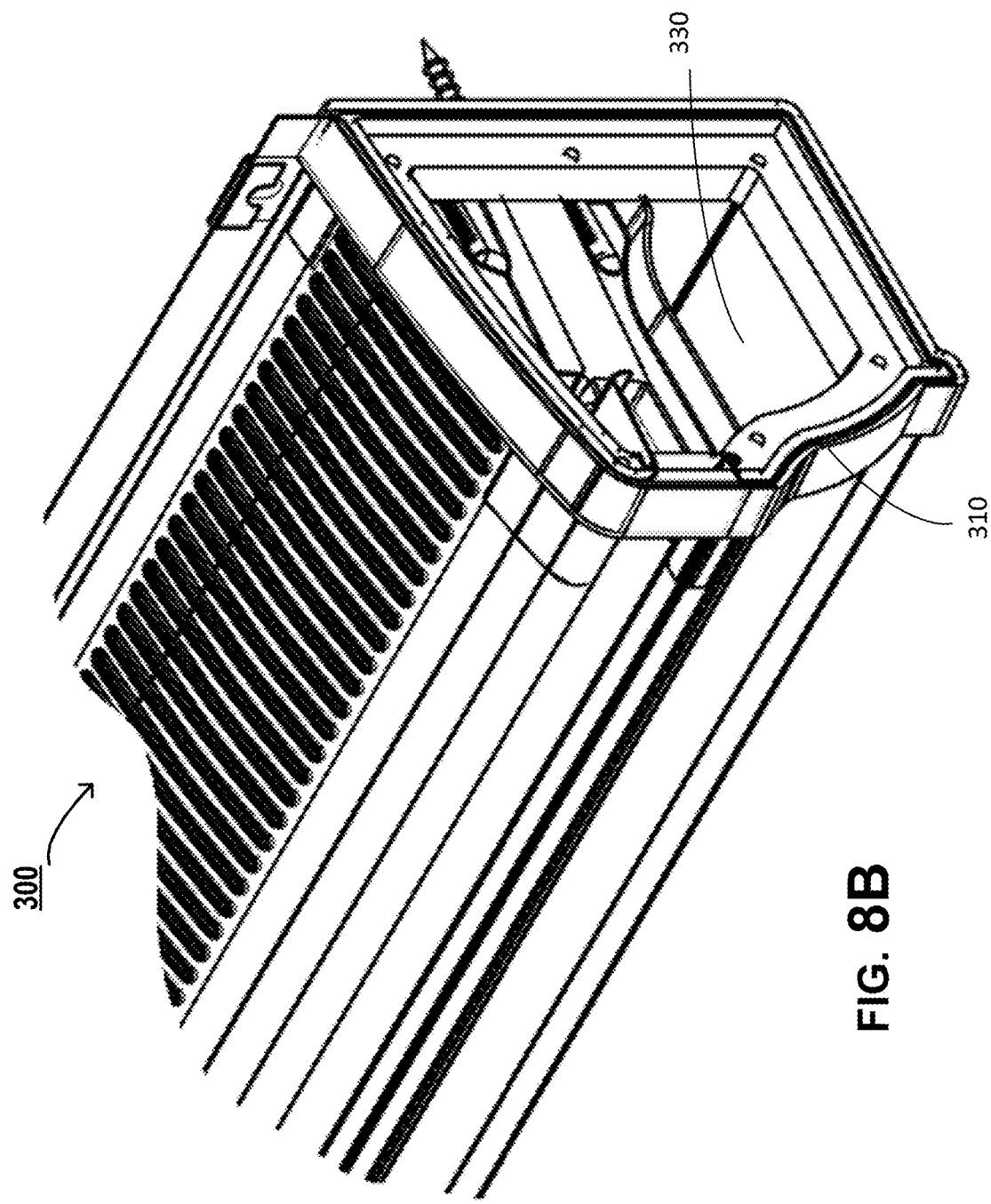
FIG. 8B illustrates a perspective view of an end cap installed on the gutter system with a portion of the end cap removed, in accordance with some embodiments of the disclosure.
Figure 8D:
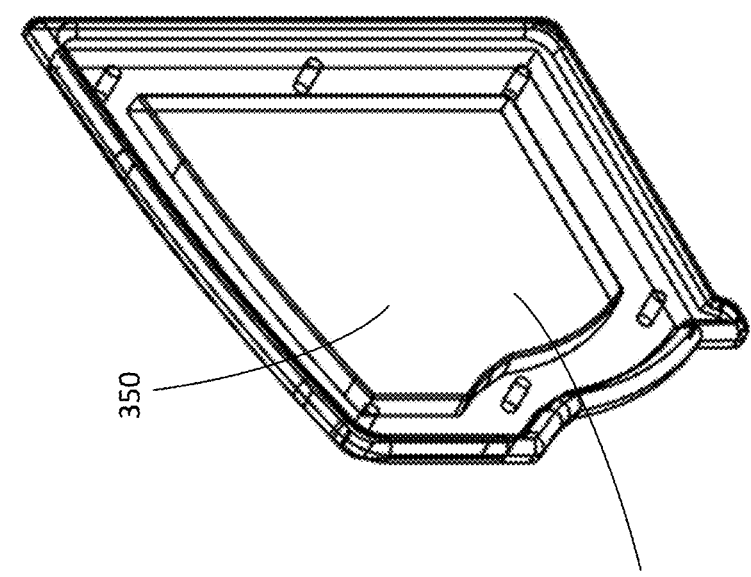
FIG. 8D illustrates a perspective view of an end cap face of the end cap, in accordance with some embodiments of the disclosure.
Figure 8C:
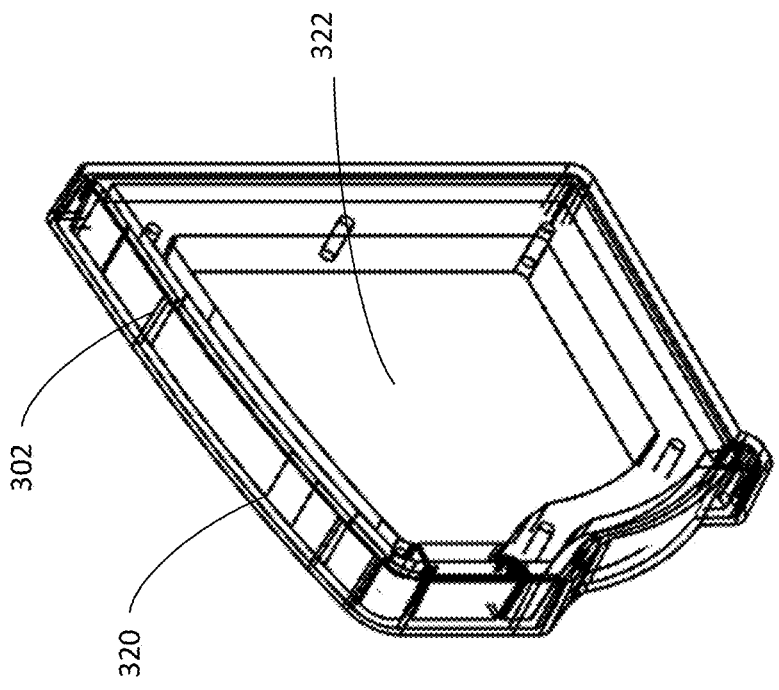
FIG. 8C illustrates a perspective view of an end cap collar of the end cap, in accordance with some embodiments of the disclosure.

FIG. 7B illustrates a side view of the cover 200 of the gutter system 10, in accordance with some embodiments of the disclosure. The intermediate portion 220 may comprise a plurality of louvers 205, where the plurality of louvers 205 block debris and allow rainwater to pass through. In some embodiments, each of the plurality of louvers 205 have one or more louver arms 206, 207 (e.g., connected, not connected, or the like) that extend towards the interior of the gutter 50 when the cover 200 is operatively coupled to the plurality of brackets 100. In some embodiments, the one or louvers 205 may be punched into cover. The one or more louver arms 206, 207 may create a curved upper surface 208 to aid all allowing the water to flow into the openings formed by the louvers 205. The design of the one or more louver arms 206, 207 allows water to easily flow into the gutter 50. The first end 210 of the cover 20 may comprise a contoured nose 212 and a first end cover projection 214. The contoured nose 212 receives the cover support portion 120 (e.g., the nose support 124) of the plurality of brackets 100 and the first end cover projection 214 is received by the cover receiving surface 122 of the support portion 110 of the bracket 100, as illustrated in FIGS. 3 and 5. In some embodiments, the first end cover projection 214 is concave. The contoured nose 212 provides surface tension to water and allows water that did not pass between the plurality of louvers 205 to enter into the gutter 50. The design of the contoured nose 212 allows debris to slide over the cover 200 and aids in restricting the debris from entering the gutter 50. A second end cover projection 222 of the second end 220 is operatively coupled to the cover receiving portion 155 of one or more of the plurality of brackets 100, as previously discussed.

FIGS. 8A through 8D illustrate an end cap 300. It should be understood that the end cap 300 may be operatively coupled to the gutter 50 and/or the cover 200 in order to retain water such that the water flows out of a downspout of the gutter 50. The end cap 300 may be a single end cap 300 that has a retaining portion 302 that extends around at least a portion of the gutter 50 and/or the cover 200. End cap connectors 308 (e.g., fasteners, such as screws, or the like) may extend through the retaining portion 302 and into or adjacent to the gutter 50 and/or cover 200.

In some embodiments, as illustrated in FIGS. 8A through 8D, the end cap 300 may comprise a first end cap portion 310 portion and a second end cap portion 350. It should be understood that the first end cap portion 310 may be operatively coupled to the gutter 50 and/or the cover 200 and the second end cap portion 350 may be operatively coupled to the first end cap portion 310 such that it can be removed from the first end cap portion 310. In some embodiments, the first end cap portion 310 may be an end cap collar 320, in which a retaining portion 302 extends around at least a portion of the gutter 50 and/or the cover 200. Moreover, the second end cap portion 350 may be an end cap face 360 that is removably operatively coupled to the end cap collar 320 through the use of one or more face connectors 390. Moreover, in some embodiments, one or more end cap seals 392 (e.g., a collar seal between the gutter 50 and the end cap collar 320, a face seal between the end cap collar 320 and the end cap face 360) may be used in order to aid in restricting water from exiting through the end cap 300.

In alternate embodiments, the second end cap portion 350 may be clipped into and/or out of the first end portion 310 (e.g., instead of operatively coupled through the use of fasteners). In other embodiments, the second end cap portion 350 may be screwed into and/or out of the first end cap portion 310. In some embodiments the end cap portion 350 may be screwed into and/or out of the first end cap portion 310 through the use of a threaded hole that receives a threaded plug. In other embodiments, the second end cap portion 350 and the first end cap portion 310 may be screwed (or rotated) with respect to each other through the use of a key and groove connection (e.g., one or more on either component). In other embodiments, the second end cap portion 350 may be hinged with respect to the first end cap portion 310.

Figure 9A:
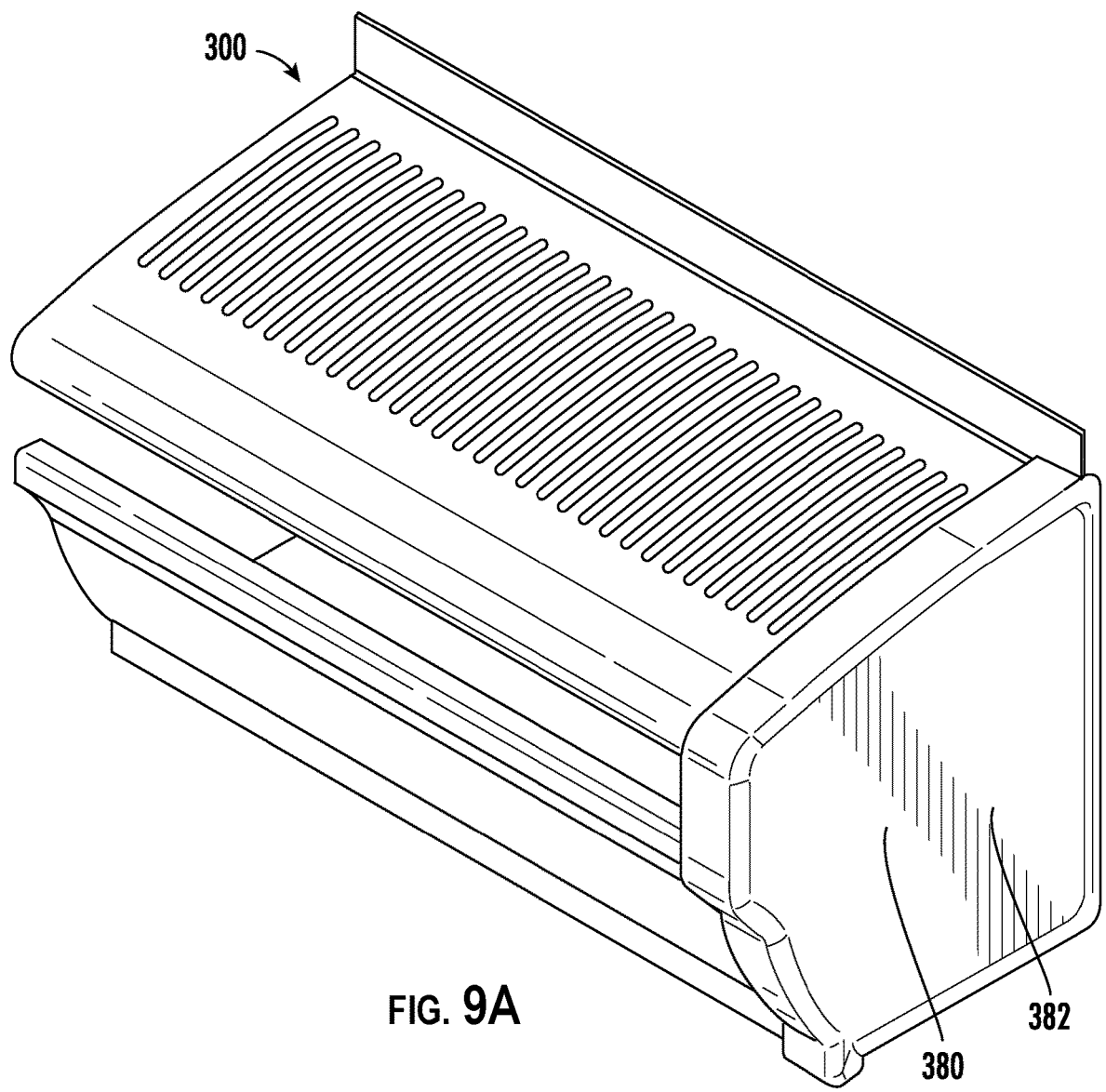
FIG. 9A illustrates a perspective view of an end cap installed on the gutter system, in accordance with some embodiments of the disclosure.
Figure 9B:
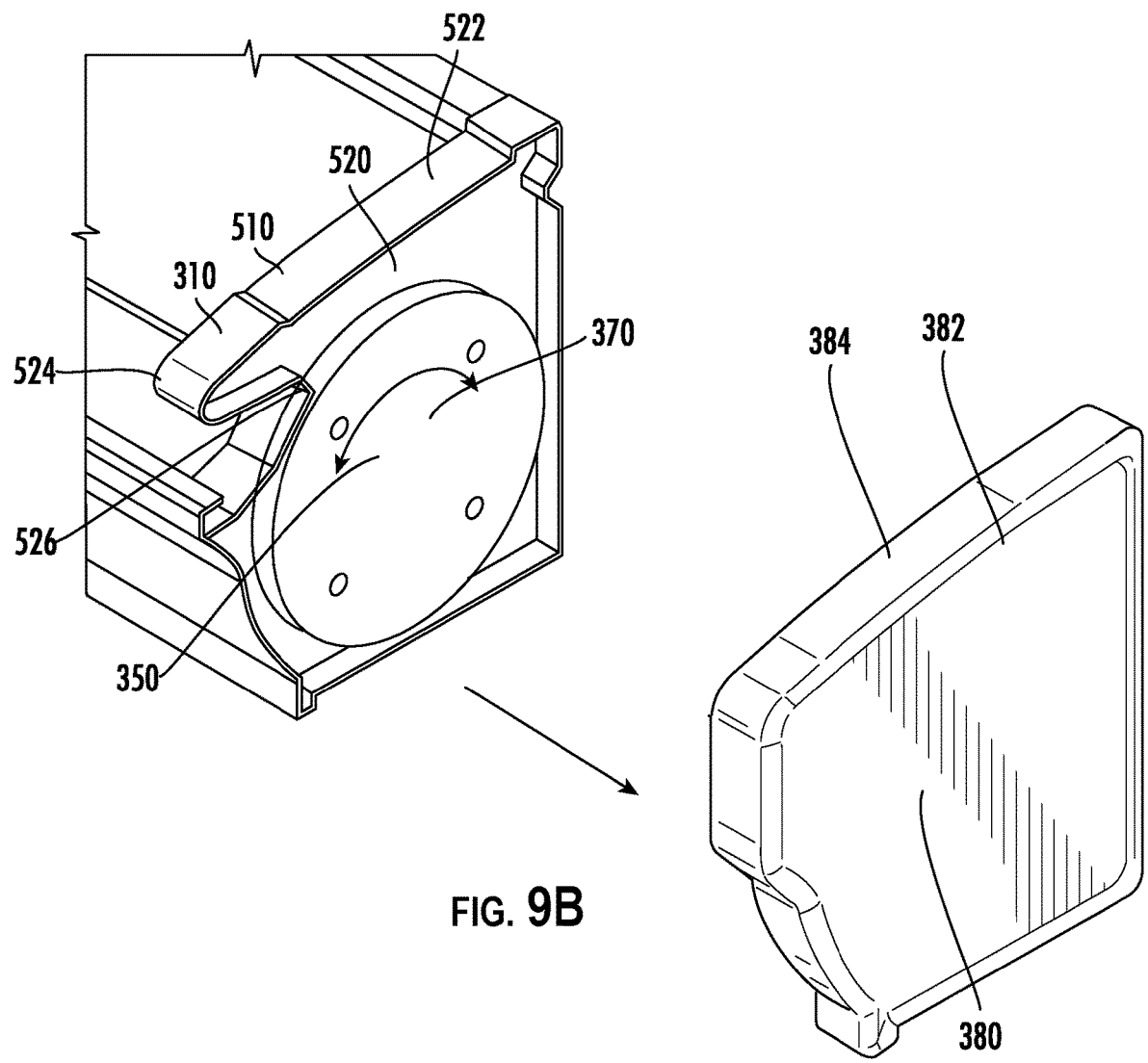
FIG. 9B illustrates a perspective partially exploded view of an end cap installed on the gutter system with a portion of the end cap removed, in accordance with some embodiments of the disclosure.
Figure 9C:
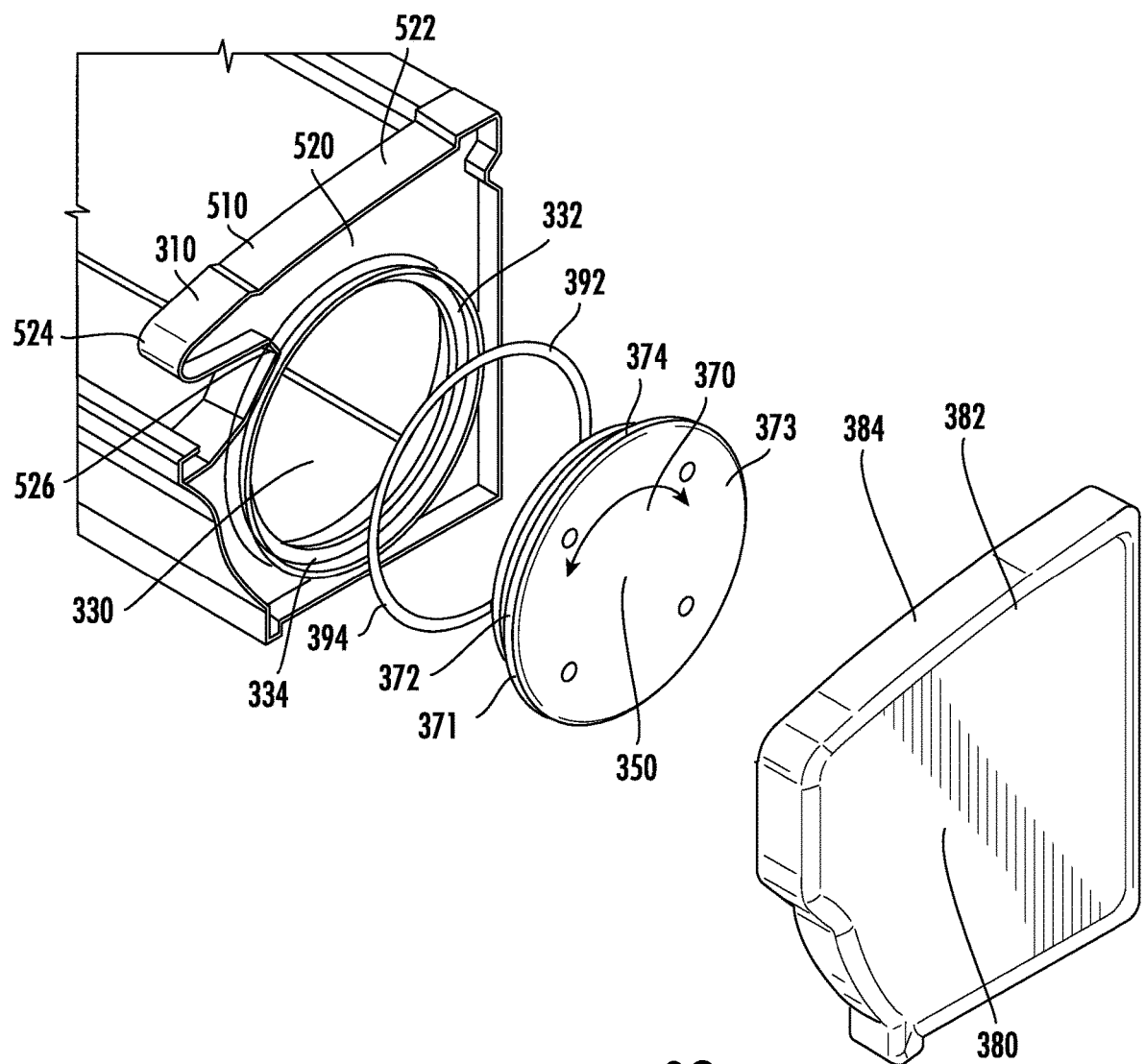
FIG. 9C illustrates a perspective exploded view of an end cap collar, an end cap plug, and an end cap face of an end cap, in accordance with some embodiments of the disclosure.
Figure 9D:
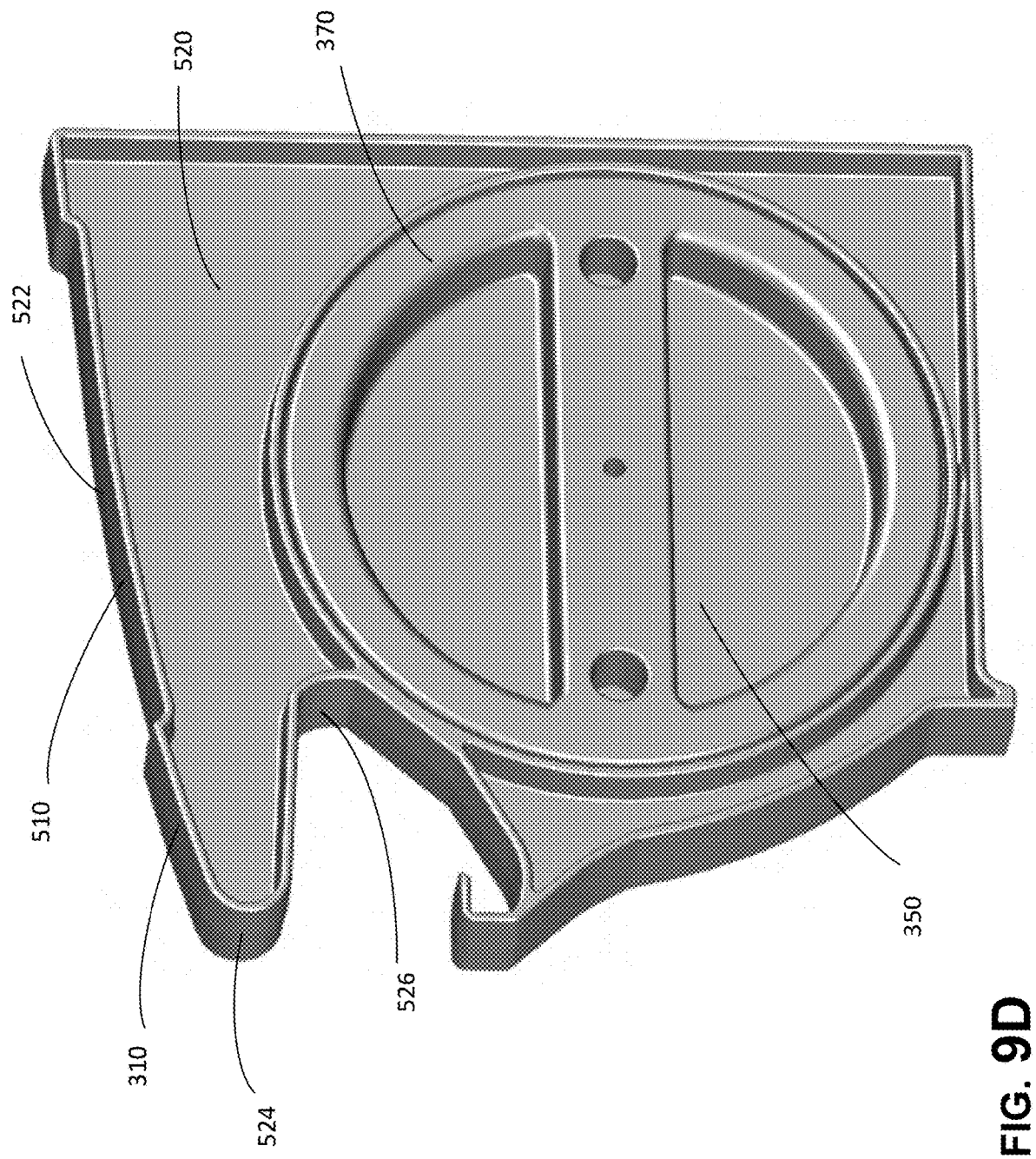
FIG. 9D illustrates a perspective view of an end cap, in accordance with some embodiments of the disclosure.
Figure 9F:
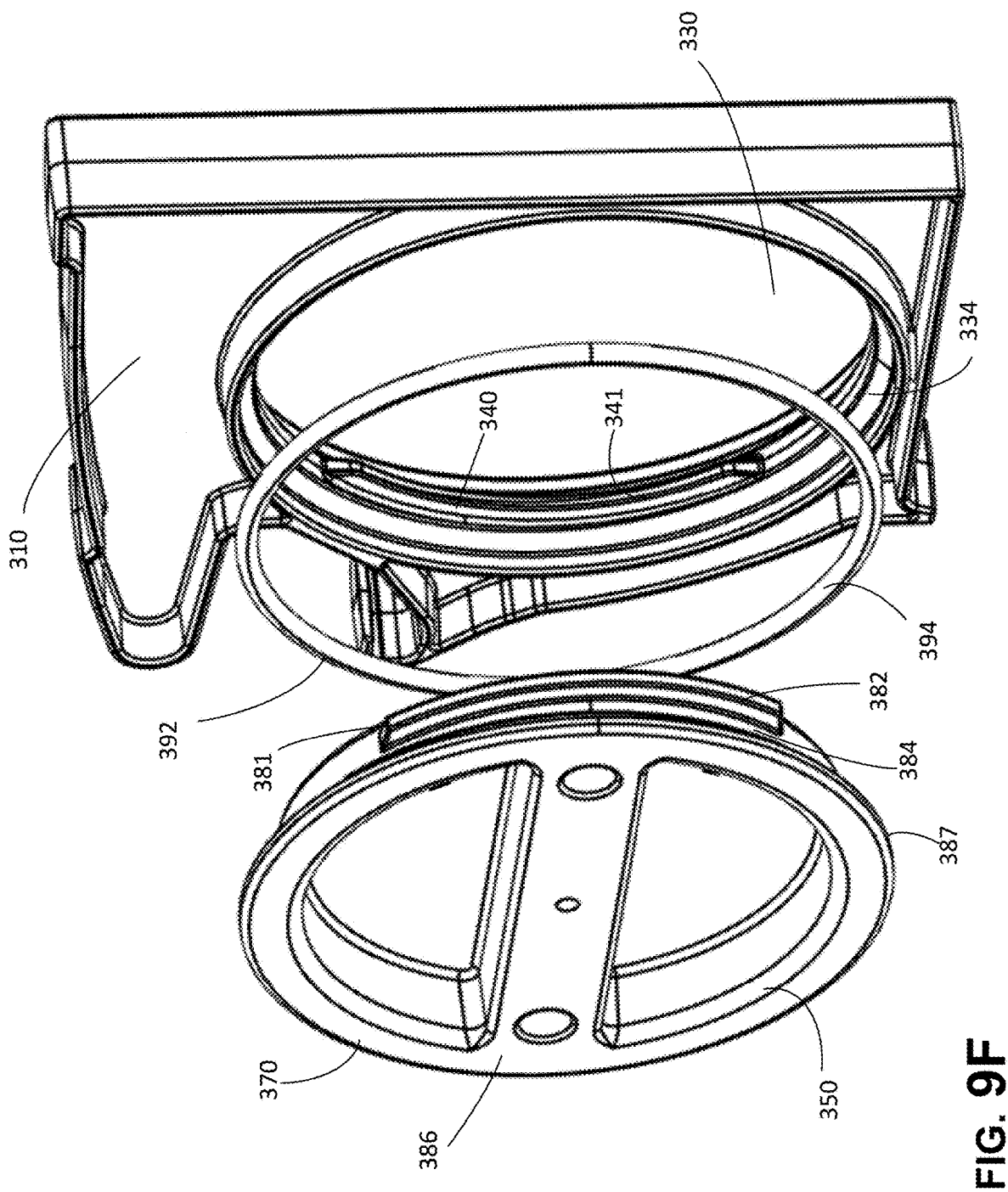
FIG. 9F illustrates a rear perspective exploded view of an end cap, in accordance with some embodiments of the disclosure.
Figure 9G:
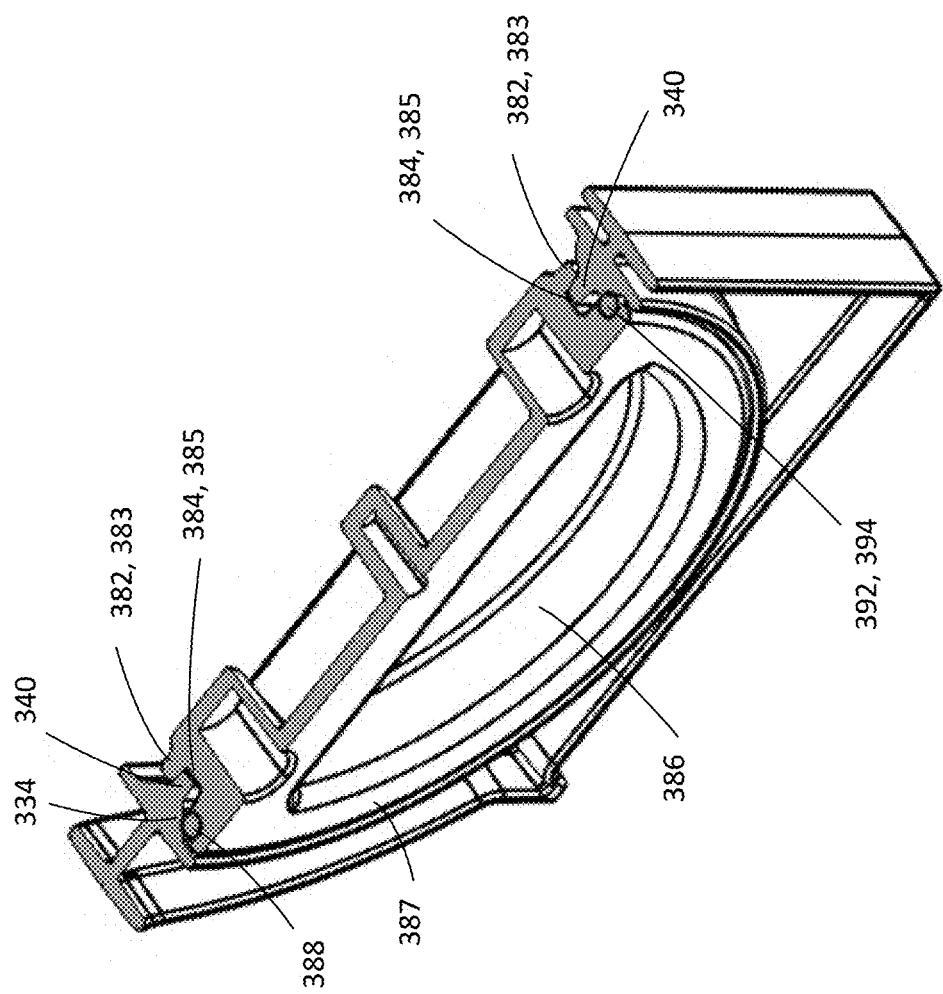
FIG. 9G illustrates a cross-sectional view of the end cap, in accordance with some embodiments of the disclosure.

FIGS. 9A through 9C illustrate embodiments of the invention, wherein the second end cap portion 350 may be screwed (or rotated) into and/or out of the first end cap portion 310. For example, in the illustrated embodiment, the first end cap portion 310 may fit within at least a portion of the profile of the gutter 50 (e.g., engage the inner surfaces and/or outer surfaces of the gutter 50, cover 200, or the like) and have an aperture 330 (e.g., service aperture) therethrough. However, it should be understood that at least a portion of the first end cap portion 310 (e.g., lip portions, or the like) may extend around the profile of the gutter 50 and/or the cover 200. The first end cap portion 310 may have threads 332 on the inside edges of the aperture 330. The first end cap portion 310 may have a first end cap sealing surface 334 and the second end cap portion 350 may have a second end cap sealing surface 388, which may aid in sealing the second end cap portion 350 with the first end cap portion 310. Moreover, like the bracket 100 previously discussed herein, the first end cap portion 310 may have a support portion 510 such as a cover support portion 520 and a gutter support portion 530. The cover support portion 520 is configured for operative coupling with the cover 200, for example, the support portion 520 engages with the cover 200 of the gutter system 10. The gutter support portion 530 is configured for operative coupling with the gutter 50, for example, an end cap lip engages with the gutter lip 52 of the gutter 50. As shown, the cover support portion 520 of the first end cap portion 310 may comprise a louver recess 522, a nose support 524, and/or a cover end receiving surface 526. The louver recess 522 of the support portion 520 is configured for receiving louvers 205 of the cover 200. The nose support 524 of the support portion 520 is configured for supporting the contoured nose 212 of the cover 200. The cover receiving surface 526 is configured for receiving a first end 210 of the cover 200. The louver recess 522 is a cavity that receives the louvers 205 of the cover 200 such that the cover 200 is smooth across the top without anything protruding from the cover 200. The nose support 524 may have a contoured surface that mates with the contoured nose 212 of the cover 200. In some embodiments, the cover receiving surface 526 is a concave receiving surface that is configured to receive a first end cover projection 214 of the cover 200.

The second end cap portion 350 may be a circular end cap portion 370 that has threads 372 (or keys, grooves, or the like) such that the circular end cap portion 370 may be screwed (or rotated) into and out of the aperture 330 of the first end cap portion 310. Moreover, in some embodiments, one or more end cap seals 392 (e.g., an o-ring seal 394 that when assembled may be located between the first end cap sealing surface 334 around the aperture 330 of the first end cap portion 310 and a second end cap sealing surface 388 of the circular end cap portion 370, or the like) may be used in order to aid in restricting water from exiting through the aperture 330 of the end cap 300.

FIG. 9C illustrates an embodiment in which the second end cap portion 350 (circular end cap portion 370) may have a second threaded portion 371 with second threads 372 and a head portion 373 with a brim 374. The second threads 372 of the second threaded portion 371 of the second end cap portion 350 (e.g., circular end cap portion 370, or the like) may be operatively coupled with the first threads 332 of the first threaded portion 331 so that the second treaded portion 371 is located within the aperture 330 of the first end cap portion 310. Moreover, the first end cap sealing surface 334 of the first end cap portion 310 and the second end cap sealing surface 388 of the second end cap portion 350 may secure and squeeze the end cap seal 393 to aid in restricting water from passing between the first end cap portion 310 and the second end cap portion 350.

FIGS. 9D through 9G illustrates an alternate embodiment of the end cap 300 in which the second end cap portion 350 (circular end cap portion 370) may have a second keyed portion 381 with one or more second keys 382 (e.g., illustrated as two second keys 383) and one or more second grooves 384 (e.g., illustrated as two grooves 385 that formed by the one or more second keys 382 and the brim 387 of the head portion 386). Furthermore, the first end cap portion 310 may have one or more first keys 340 (e.g., illustrated as two first keys 341) which may or may not have one or more first grooves (not illustrated) formed between the one or more first keys 340 and a first end cap 310 (e.g., by a projection that forms the aperture 330, or the like). As such, the second keyed portion 381 having the one or more second keys 382 may be inserted into the aperture 330 of the first end cap portion 310 and pass the one or more first keys 340. For example, gaps between the one or more second keys 382 and the one or more first keys 340 may allow the keys 382, 340 to pass each other such that the one or more second keys 382 are located longitudinally behind the one or more first keys 340. The second end cap portion 350 may be rotated to operatively couple the one or more first keys 340 and the one or more second keys 382 together. As illustrated in the cross-sectional view of FIG. 9G, the one or more first keys 340 of the first end cap portion 310 may be operatively coupled within the one or more second grooves 384, while the one or more second keys 382 are located behind the inner surface (e.g., facing the gutter 50) of the one or more first keys 340. Moreover, as illustrated in the cross-sectional view of FIG. 9G, and end cap seal 392 is squeezed between the first end cap sealing surface 334 around the aperture 330 of the first end cap portion 310 and a second end cap sealing surface 388 adjacent the brim 381 of the circular end cap portion 370.

In some embodiments, as illustrated in FIG. 9C, a third end cap portion 380 may be operatively coupled to the first end cap portion 310 and/or the second end cap portion 350. The third end cap portion 380 may comprise an end cap face 382 that has a retaining portion 384. The retaining portion 384 may extend around at least a portion of the gutter 50, cover 200, the first end cap portion 310, and/or the second end cap portion 350. In some embodiments, the end cap face 382 may be operatively coupled to the first end cap portion 310 and/or second end cap portion 350, such as clipped into and/or out of the first end cap portion 310 and/or the second end cap portion 350; secured to the first end cap portion 310, second end cap portion 350, gutter 50, and/or cover 200 using fasteners; hinged with respect to the first end cap portion 310 and/or second end cap portion 350; or the like.

Since the second end cap portion 350 is removable from the first end cap portion 310, after the gutter system 10 is installed on a structure, the second end cap portion 350 may be removable from the first end cap portion 310 in order to easily access the interior of the gutter system 10. In this way, the gutter 50 may be cleaned of any debris that may enter the gutter 50. Moreover, the gutter 50 may be cleaned out by spraying water (e.g., from a hose, pressure nozzle, or the like) to remove debris from the gutter 50.

Figure 10:
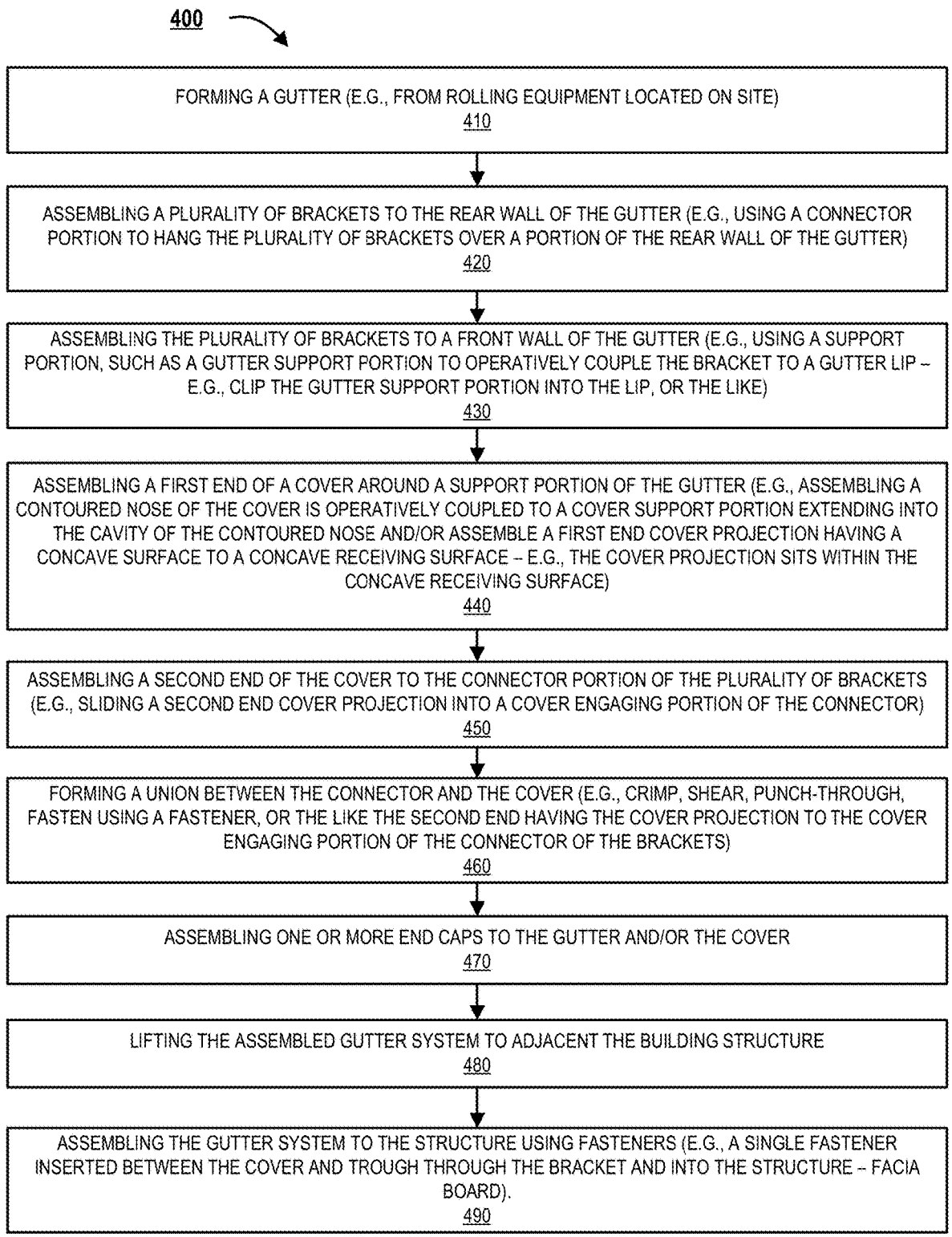
FIG. 10 illustrates a process flow for assembling a gutter system together and to a structure, in accordance with some embodiments of the disclosure.

FIG. 10 illustrates a process flow for assembling a gutter system together and to a structure, in accordance with some embodiments of the disclosure.

As shown in block 410, the process flow comprises forming the gutter 50 (e.g., from rolling equipment located on site, or the like). One or more pieces of the gutter 50 may be operatively coupled to each other based on the shape of the roof of the building receiving the gutter system 10. In some embodiments, each of the one or more pieces of the gutter 50 may be cut based on the dimensions of the building.

As shown in block 420, the process flow comprises assembling a plurality of brackets 100 to the rear wall 58 of the gutter 50 (e.g., using the connector portion 150 to hang the plurality of brackets 100 over a portion of the rear wall 58 of the gutter 50, using the one or more rear wall projections 144, and/or using the rear wall 142 of the rear support portion 140 of the bracket 100 to butt up against the gutter rear wall 58). In some embodiments, the plurality of brackets 100 may be placed at equal intervals or non-equal intervals within the gutter 50. In some embodiments, more than one bracket 100 may be used in some locations of the gutter 50 where additional support may be needed.

As shown in block 430, the process flow comprises assembling the plurality of brackets 100 to the front wall 54 of the gutter 50 (e.g., using a support portion 110). For example, a gutter support portion 130, such as a support lip 102, is operatively coupled to the gutter 50, such as to a gutter lip 52. For example, the gutter lip 52 clipped to the support lip 102 of the gutter support portion 110. It should be understood that the processes described in blocks 420 and 430 may occur in any order or at the same time. Based on block 420 and 430, the one or more brackets 100 may be supported within the gutter 50 before assembling the cover and/or before the gutter system 10 to a structure.

As shown in block 440, the process flow comprises assembling a first end 210 of a cover 200 around a support portion 110 of the bracket 100. For example, the contoured nose 212 of the cover 200 may be assembled over the cover support portion 120 (e.g., the nose support 124), such that the cover support portion 120 extends into the cavity of the contoured nose 212. Moreover, in some embodiments the first end cover projection 214 (e.g., having a concave surface, or the like) is assembled to the cover receiving surface 126 (e.g., the cover projection sits within the concave receiving surface, or the like). In some embodiments, a cover fastener may extend through the first end cover projection 214 and the cover receiving surface 126. The concave surfaces of the first end cover projection 214 and/or the cover receiving surface 120 may aid in positioning and/or guiding the fastener in the proper location. In other embodiments, the cover fastener at the first end cover projection 214 and the cover receiving surface 126 is not needed.

As shown in block 450, the process flow further comprises assembling a second end 220 of the cover 200 to the connector portion 150 of the plurality of brackets 100 (e.g., positioning the second end cover projection 222 adjacent to an open cover engaging portion 155, sliding the second end cover projection 222 into a closed cover engaging portion 155, or the like). As shown in block 460, the process flow also comprises forming a union between the connector portions 150 of the plurality of brackets 100 and the cover 100, such as by deforming the cover engaging portion 155 around the second end cover projection 222 (e.g., crimp, squeeze, shear, punch-through, or the like) and/or fasten (e.g., using a fastener—screw, rivet, or the like, or the like). For example, the second end cover projection 222 on the second end 220 of the cover 200 may engage with the cover engaging portion 155 and a union is formed (e.g., slide within the hook of the engaging portion 155 and/or have the engaging portion deformed around the second end cover projection 222).

Block 470 illustrates that one or more end caps 300 are operatively coupled to the gutter system 10. For example, the one or more end caps 300 may slide over and/or within the edges of the gutter 50 and/or the cover 100 such that the retaining portion 302 of the end cap 300 extends around at least a portion of the gutter 50 and/or the cover 200, and is operatively coupled thereto by one or more end cap connectors 308 (e.g., fasteners that extend through the retaining portion 302 and into the cover and/or gutter). Alternatively, or additionally, the end cap 300 may comprise a first end cap portion 310 portion and a second end cap portion 350. It should be understood that the first end cap portion 310 may be operatively coupled to the gutter 50 and/or the cover 200 (e.g., similar to how the brackets 100 may be operatively coupled to the gutter 50 and/or cover 200) and the second end cap portion 350 may be operatively coupled to the first end cap portion 310 (or the gutter 50 and/or cover 200 in some embodiments) such that it can be removed from the first end cap portion 310. As such, the second end cap portion 350 may be removed after installation in order to access the gutter 50 for cleaning out debris from the gutter system 10.

As shown in block 480, the process flow comprises lifting the assembled gutter system 10 to adjacent the building structure. In some embodiments, machinery may be used to lift the assembled gutter system 10 and/or the gutter system 10 may be lifted manually by installers. As shown in block 490, the process flow comprises assembling the gutter system 10 to the structure using fasteners (e.g., single fastener 114 inserted between the cover 200 and gutter trough 50 through the bracket 100 and into a support member of the structure—facia board, or the like).

Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more."

It should be understood that "operatively coupled," when used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together.

Certain terminology is used herein for convenience only and is not to be taken as a limiting, unless such terminology is specifically described herein for specific embodiments. For example, words such as "top", "bottom", "upper", "lower", "below", "above", "vertical", "horizontal", "first", "second", "third", or the like may merely describe the configurations shown in the figures and described herein for some embodiments of the invention. Indeed, the components may be oriented in any direction and the terminology, therefore, should be understood as encompassing such variations unless specified otherwise. The terminology includes the words specifically mentioned above, derivatives thereof and words of similar import.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A gutter system, wherein the system comprises:
   a gutter, wherein the gutter comprises:
      a rear wall;
      a bottom wall operatively coupled to the rear wall;
      a front wall operatively coupled to the bottom wall; and
      a gutter lip operatively coupled to the front wall;
   a plurality of brackets at least partially located within the gutter, wherein each of the plurality of brackets comprise:
      a support portion operatively coupled to the gutter lip of the gutter, wherein the support portion comprises:
         a rear wall projection; and
         a cover support portion forming a louver recess;
      a connector portion operatively coupled to the support portion, wherein the connector portion comprises:
         a cover engaging portion; and
         a connector projection aperture;
      wherein the connector portion is operatively coupled to the support portion by inserting the rear wall projection through the connector projection aperture and rotating the connector portion with respect to the support portion to lock the connector portion in place; and
   a cover comprising a first cover end, a second cover end, and an intermediate portion between the first cover end and the second cover end, wherein the intermediate portion comprises a plurality of louvers, and the second cover end comprises a second end cover projection;
wherein the cover is operatively coupled to the plurality of brackets through at least the cover engaging portion extending around the second end cover projection; and
wherein the louver recess receives a portion of one or more louvers of the plurality of louvers, and a surface of the cover support portion within the louver recess is configured to support at least a portion of the one or more louvers of the cover.

2. The system of claim 1, wherein the plurality of brackets are operatively coupled to the gutter and the cover is operatively coupled to the plurality of brackets before the plurality of brackets are operatively coupled to a structure.

3. The system of claim 1, wherein the support portion further comprises:
a gutter support portion operatively coupled to the gutter lip of the gutter.

4. The system of claim 1, wherein the support portion comprises a support joint, and the connector portion comprises a connector joint, and wherein a fastener operatively couples the connector portion to the support portion through the support joint and the connector joint.

5. The system of claim 1, wherein the connector portion is made from aluminum, and the support portion is made from plastic.

6. The system of claim 1, wherein the gutter further comprises:
a protrusion extending from the front wall or the bottom wall along at least a portion of a length of the gutter, wherein the protrusion forms a surface tension break configured to interrupt surface tension of water.

7. The system of claim 1, wherein the plurality of louvers extend perpendicular to the first cover end and the second cover end.

8. The system of claim 1, wherein each of the plurality of brackets comprise:
a single fastener cavity, wherein the plurality of brackets are operatively coupled to a structure using a single fastener extending through the single fastener cavity.

9. The system of claim 1, wherein each of the plurality of brackets comprise:
a cover receiving surface, wherein the cover receiving surface is a concave receiving surface that receives a first end cover projection.

10. The system of claim 1, wherein the first cover end of the cover comprises a contoured nose that receives a nose support of the cover support portion of the support portion of the plurality of brackets.

11. The system of claim 1, wherein the plurality of louvers have one or more louver arms that extend towards the gutter when the cover is operatively coupled to the plurality of brackets.

12. The system of claim 1, wherein the first cover end of the cover comprises a contoured nose that receives a nose support of the cover support portion of the support portion of the plurality of brackets and a first end cover projection having a concave projection surface that is received by a concave receiving surface of the plurality of brackets.

13. The system of claim 1, further comprising:
at least one end cap, wherein the at least one end cap comprises:
a first portion, wherein the first portion is configured to be operatively coupled to the gutter; and
a second portion configured to be operatively coupled to the first portion from either side of the first portion for use on either end of the gutter, wherein the second portion is removeable when installed for accessing an interior of the gutter by rotating the second portion with respect to the first portion.

14. A method of installing a gutter system, the method comprising:
assembling a plurality of brackets to a gutter, wherein the gutter comprises a rear wall, a bottom wall operatively coupled to the rear wall, a front wall operatively coupled to the bottom wall, and a gutter lip operatively coupled to the front wall, wherein the plurality of brackets comprise:
a support portion operatively coupled to the gutter lip of the gutter, wherein the support portion comprises:
a rear wall projection; and
a cover support portion forming a louver recess;
a connector portion operatively coupled to the support portion, wherein the connector portion comprises:
a cover engaging portion; and
a connector projection aperture;
wherein the connector portion is operatively coupled to the support portion by inserting the rear wall projection through the connector projection aperture and rotating the connector portion with respect to the support portion to lock the connector portion in place; and
assembling a cover to the plurality of brackets, wherein the cover comprises a first cover end, a second cover end, and an intermediate portion between the first cover end and the second cover end, wherein the intermediate portion comprises a plurality of louvers and the second cover end comprises a second end cover projection, and wherein assembling the cover to the plurality of brackets comprises:
assembling the first cover end of the cover around the cover support portion of the support portion of the plurality of brackets;
assembling at least a portion of one or more louvers of the plurality of louvers of the cover within the louver recess that is configured to support at least a portion of the one or more louvers of the cover; and
assembling the cover engaging portion of the connector portion around the second end cover projection; and
lifting the gutter system for installation to a structure; and
fastening the plurality of brackets to the structure using one or more fasteners through the plurality of brackets.

15. A gutter system, wherein the system comprises:
a gutter, wherein the gutter comprises:
a rear wall;
a bottom wall operatively coupled to the rear wall;
a front wall operatively coupled to the bottom wall; and
a gutter lip operatively coupled to the front wall;
a plurality of brackets at least partially located within the gutter, wherein each of the plurality of brackets comprise:
a support portion operatively coupled to the gutter lip of the gutter, wherein the support portion comprises:
a support joint; and
a cover support portion forming a louver recess;
a connector portion operatively coupled to the support portion, wherein the connector portion comprises:
a cover engaging portion; and
a connector joint;
wherein a fastener operatively couples the connector portion to the support portion through the support joint and the connector joint; and a cover comprising a first cover end, a second cover end, and an intermediate portion between the first cover end and the second cover end, wherein the intermediate portion comprises a plurality of louvers, and the second cover end comprises a second end cover projection;

wherein the cover is operatively coupled to the plurality of brackets through at least the cover engaging portion extending around the second end cover projection; and wherein the louver recess receives a portion of one or more louvers of the plurality of louvers, and a surface of the cover support portion within the louver recess is configured to support at least a portion of the one or more louvers of the cover.

16. A gutter system, wherein the system comprises:
a gutter, wherein the gutter comprises:
 a rear wall;
 a bottom wall operatively coupled to the rear wall;
 a front wall operatively coupled to the bottom wall; and
 a gutter lip operatively coupled to the front wall;
a plurality of brackets at least partially located within the gutter, wherein each of the plurality of brackets comprise:
 a support portion operatively coupled to the gutter lip of the gutter, wherein the support portion comprises:
  a concave receiving surface;
  a nose support; and
  a cover support portion forming a louver recess;
a cover comprising:
 a first cover end comprising:
  a first end cover projection having a concave projection surface that is received by the concave receiving surface of the support portion;
  a contoured nose that receives the nose support of the cover support portion;
 a second cover end; and
 an intermediate portion between the first cover end and the second cover end, wherein the intermediate portion comprises a plurality of louvers; and
wherein the louver recess receives a portion of one or more louvers of the plurality of louvers, and a surface of the cover support portion within the louver recess is configured to support at least a portion of the one or more louvers of the cover.

* * * * *